(12) United States Patent
Okubo

(10) Patent No.: US 10,647,234 B2
(45) Date of Patent: May 12, 2020

(54) SEAT DEVICE FOR VEHICLE AND METHOD OF ASSEMBLING SAME

(71) Applicant: TS TECH CO., LTD., Asaka-Shi, Saitama (JP)

(72) Inventor: Takuya Okubo, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 16/447,825

(22) Filed: Jun. 20, 2019

(65) Prior Publication Data

US 2019/0299828 A1  Oct. 3, 2019

Related U.S. Application Data

(63) Continuation of application No. 16/193,533, filed on Nov. 16, 2018, which is a continuation of application (Continued)

(30) Foreign Application Priority Data

| Jul. 6, 2012 | (JP) | 2012-152365 |
| Jul. 6, 2012 | (JP) | 2012-152366 |

(Continued)

(51) Int. Cl.
*B60N 2/80* (2018.01)
*B60N 2/68* (2006.01)
(Continued)

(52) U.S. Cl.
CPC ............ *B60N 2/80* (2018.02); *B60N 2/68* (2013.01); *B60N 2/682* (2013.01); *F16F 7/108* (2013.01);
(Continued)

(58) Field of Classification Search
CPC .. B60N 2/48; B60N 2/68; B60N 2/682; B60N 2/4885; B60N 2/4428;
(Continued)

(56) References Cited

U.S. PATENT DOCUMENTS

| 2,098,456 A | 11/1937 | Leader et al. |
| 4,673,214 A | 6/1987 | Meiller |

(Continued)

FOREIGN PATENT DOCUMENTS

| DE | 2945060 A1 | 5/1981 |
| FR | 2849814 A1 | 7/2004 |

(Continued)

OTHER PUBLICATIONS

PCT/ISA/210 from the International Application PCT/JP2013/067103.

*Primary Examiner* — Jose V Chen
(74) *Attorney, Agent, or Firm* — Carrier Blackman & Associates, P.C.; Joseph P. Carrier; William D. Blackman

(57) ABSTRACT

A seat device for a vehicle includes a dynamic damper attached to a frame of a seat installed in the vehicle. The dynamic damper includes a damper case that is formed from separable first and second case halves, a weight that is housed in a damper chamber, and an elastic member that is disposed between the weight and the damper chamber so as to allow vibration of the weight. The damper case is provided with a plurality of mounting parts that are mounted on the frame, and the mounting parts comprise first and second mounting parts which are engaged with the frame at two left and right places as seen in a front view of the seat, and a third mounting part other than the first and second mounting parts which is provided between the first and second mounting parts.

17 Claims, 24 Drawing Sheets

Related U.S. Application Data

No. 15/902,256, filed on Feb. 22, 2018, now Pat. No. 10,131,261, which is a continuation of application No. 15/493,813, filed on Apr. 21, 2017, now Pat. No. 9,937,829, which is a continuation of application No. 14/413,030, filed as application No. PCT/JP2013/067103 on Jun. 21, 2013, now Pat. No. 9,746,048.

(30) Foreign Application Priority Data

| Jul. 26, 2012 | (JP) | 2012-166037 |
|---|---|---|
| Jul. 31, 2012 | (JP) | 2012-170551 |
| Apr. 25, 2013 | (JP) | 2013-092947 |

(51) Int. Cl.
*F16F 7/108* (2006.01)
*B60N 2/891* (2018.01)

(52) U.S. Cl.
CPC ........ *B60N 2/891* (2018.02); *B60N 2002/899* (2018.02)

(58) Field of Classification Search
CPC ............. B60N 2/4808; B60N 2205/20; B60N 2002/4888; B60N 2002/4891; B60N 2/80; B60N 2/4228
USPC .......................... 297/404, 410, 391; 267/136
See application file for complete search history.

(56) References Cited

U.S. PATENT DOCUMENTS

| 7,871,129 | B2 | 1/2011 | Boes et al. |
|---|---|---|---|
| 8,414,078 | B2 | 4/2013 | Fujita |
| 8,491,052 | B2 | 7/2013 | Werner |
| 8,814,271 | B2 | 8/2014 | Ishimoto et al. |
| 8,833,859 | B2 | 9/2014 | Matsushima et al. |
| 8,869,957 | B2 | 10/2014 | Okimura et al. |
| 8,899,685 | B2 | 12/2014 | Haeske et al. |
| 8,955,913 | B2 | 2/2015 | Veine et al. |
| 9,452,697 | B2 * | 9/2016 | Okubo .................. F16F 7/108 |
| 9,746,048 | B2 | 8/2017 | Okubo |
| 9,937,829 | B2 | 4/2018 | Okubo |
| 9,981,587 | B2 | 5/2018 | Mizobata et al. |
| 10,131,261 | B2 | 11/2018 | Okubo |
| 2003/0062230 | A1 | 4/2003 | Maeno et al. |
| 2008/0100118 | A1 | 5/2008 | Young et al. |
| 2011/0109143 | A1 | 5/2011 | Maddelein et al. |
| 2015/0183343 | A1 | 7/2015 | Okubo et al. |

FOREIGN PATENT DOCUMENTS

| JP | S60-151135 A | 8/1985 |
|---|---|---|
| JP | H04-46246 U | 4/1992 |
| JP | 05-93296 U | 12/1993 |
| JP | H08-289827 A | 11/1996 |
| JP | H10-226255 A | 8/1998 |
| JP | 2001-161489 A | 6/2001 |
| JP | 2002-242986 A | 8/2002 |
| JP | 2003-226179 A | 8/2003 |
| JP | 2005-280528 A | 10/2005 |
| JP | 2006-034326 A | 2/2006 |
| JP | 2008-296732 A | 12/2008 |
| JP | 2010-095054 A | 4/2010 |
| JP | 2010-147094 A | 7/2010 |
| JP | 2010-194246 A | 9/2010 |
| JP | 2011-011003 A | 1/2011 |
| JP | 2013-010416 A | 1/2013 |

* cited by examiner

FIG.21

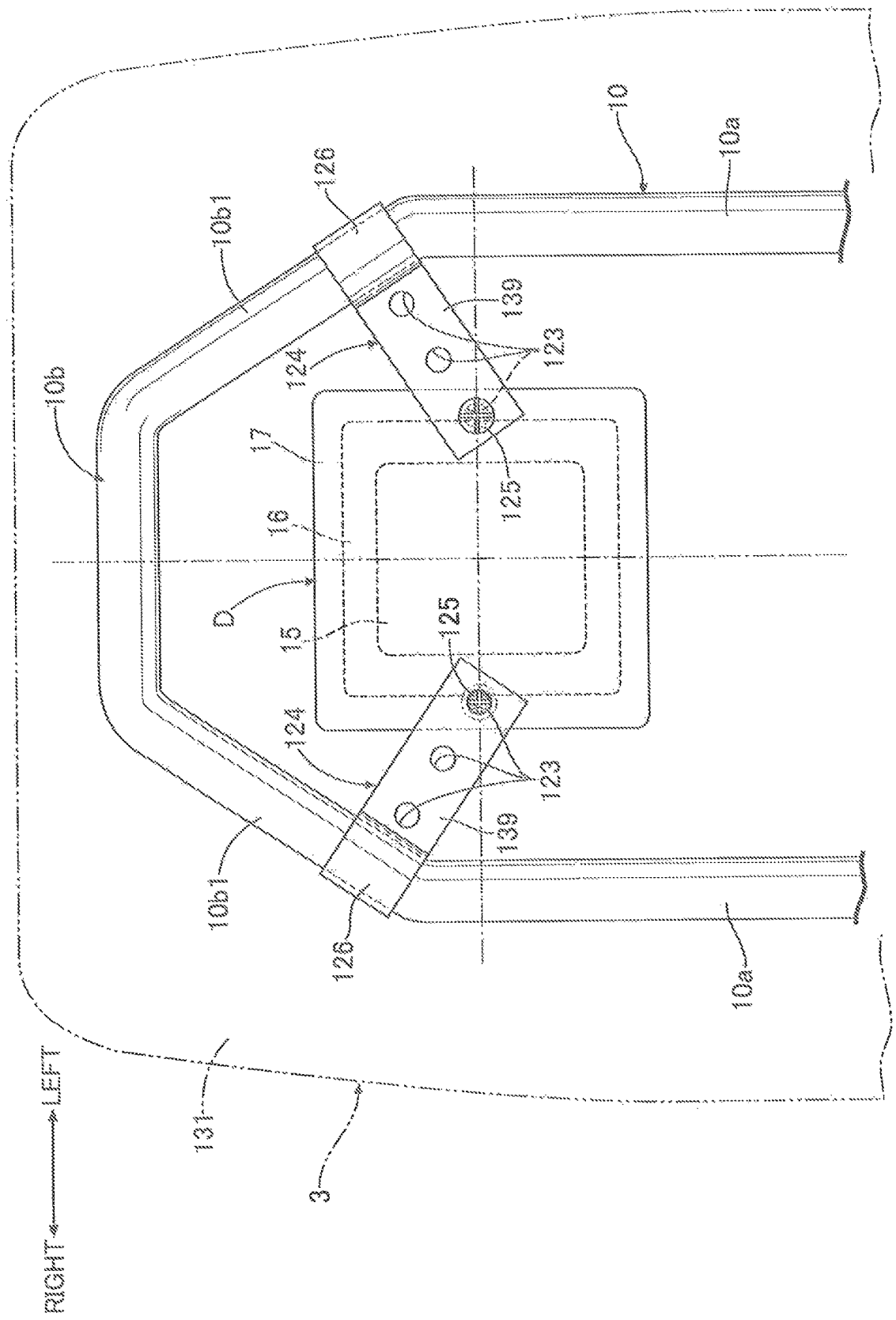

SEAT DEVICE FOR VEHICLE AND METHOD OF ASSEMBLING SAME

CROSS-REFERENCE TO RELATED APPLICATIONS

This application is a continuation application of the U.S. patent application Ser. No. 16/193,533, filed on Nov. 16, 2018, which is a continuation application of U.S. patent application Ser. No. 15/902,256 (now U.S. Pat. No. 10,131,261 B2), filed on Feb. 22, 2018, which is a continuation application of the U.S. patent application Ser. No. 15/493,813 (now U.S. Pat. No. 9,937,829 B2), filed 21 Apr. 2017, which is a continuation application of the U.S. patent application Ser. No. 14/413,030 (now U.S. Pat. No. 9,746,048 B2), filed on Jan. 6, 2015, which is US National Phase of International Application No. PCT/JP2013/067103, filed Jun. 21, 2013, and which claims priority from five Japanese Patent Applications, i.e., Nos. 2012-152365 and 2012-152366 both filed on Jul. 6, 2012, No. 2012-166037 filed Jul. 26, 2012, No. 2012-170551 filed Jul. 31, 2012, and No. 2013-092947 filed Apr. 25, 2013. The entire contents of these prior applications are incorporated herein by reference.

TECHNICAL FIELD

The present invention relates to an improvement of a seat device for a vehicle that includes a dynamic damper attached to a seat frame installed in the vehicle.

BACKGROUND ART

In such a seat device for a vehicle, an arrangement in which the dynamic damper is formed from a housing, this housing, a weight housed within the housing so that it can vibrate, and an elastic member that is disposed between the weight and the housing is known, as disclosed in Patent Document 1 below.

RELATED ART DOCUMENTS

Patent Documents

Patent Document 1: Japanese Patent Application Laid-open No. 2002-242986

SUMMARY OF THE INVENTION

Problems to be Solved by the Invention

In the dynamic damper in the seat device for a vehicle disclosed in Patent Document 1 above, after the weight and the elastic member are housed in the housing, the entirety of the housing is made into a unit so that it cannot come apart; once the dynamic damper is assembled, even if it is necessary to adjust or change the damping characteristics, it is impossible to replace the weight and the elastic member with ones having different characteristics, and a new dynamic damper has to be prepared, which is not economical. Moreover, since the housing is not provided with a mounting part for a seat, when mounting on the seat it becomes necessary to use a special mounting implement such as a band, and the mounting operation is also cumbersome.

The present invention has been accomplished in light of such circumstances, and it is an object thereof to provide a seat device for a vehicle in which replacement of a weight and an elastic member in order to adjust or change the damping characteristics is possible, and the ease of mounting a damper case (housing) on a seat is good.

Means for Solving the Problems

In order to attain the above object, according to a first aspect of the present invention, there is provided a seat device for a vehicle, comprising a dynamic damper attached to a frame of a seat installed in the vehicle, characterized in that the dynamic damper comprises a damper case that is formed from first and second case halves joined together so as to be capable of separating from each other to define a damper chamber therebetween, a weight that is housed in the damper chamber, and an elastic member that is disposed between the weight and an inner face of the damper chamber so as to allow vibration of the weight, the damper case being provided with a mounting part that is mounted on frames. It should be noted here that the elastic member corresponds to an elastic sheet 16, and the mounting part corresponds to an elastic support member 24A, 24B, 24C, 50, respectively, of embodiments of the present invention, which are described later.

Further, according to a second aspect of the present invention, in addition to the first aspect, one and the other of the first and second case halves have formed thereon a plurality of pairs of elastic linking claws and linking holes that snap fit together to join the two case halves.

Furthermore, according to a third aspect of the present invention, in addition to the second aspect, the plurality of pairs of elastic linking claws and linking holes are disposed at positions sandwiching the weight.

Moreover, according to a fourth aspect of the present invention, in addition to the first aspect, the elastic member comprises an elastic sheet, and this elastic sheet is disposed in a compressed state between an outer face of the weight and an inner face of the damper chamber that opposes the outer face.

Further, according to a fifth aspect of the present invention, in addition to any one of the first to fourth aspects, one and the other of mating faces of the first and second case halves are provided with a mating groove and a mating projecting wall that surround the damper chamber and can fit together.

Furthermore, according to a sixth aspect of the present invention, in addition to any one of the first to fifth aspects, an end wall of at least one of the first and second case halves is curved so as to protrude outwardly.

Moreover, according to a seventh aspect of the present invention, in addition to any one of the first to sixth aspects, the damper case is mounted on the frame of at least one of a seat back and a headrest, and the weight within the damper case is formed so that the center of gravity of the weight is positioned above a center in the vertical direction of the weight.

Further, according to an eighth aspect of the present invention, in addition to the seventh aspect, a gap between a side face of the weight and an inside face of the damper chamber opposing the side face with the elastic member sandwiched therebetween increases in going away from a support point of a vibration system on which the dynamic damper is mounted.

Furthermore, according to a ninth aspect of the present invention, in addition to the first aspect, a recess portion is provided in an outside face of the case half on the side that has the linking hole, the recess portion receiving a claw part of the elastic linking claw engaged with the linking hole.

Moreover, according to a tenth aspect of the present invention, in addition to any one of the first to ninth aspects, the headrest of the seat comprises a headrest frame supported on an upper end part of the seat back and a cushion member formed from a foam material in which is embedded an upper part of the headrest frame, the damper case is retained on the headrest frame via the mounting part and embedded in the cushion member, and the elastic member supporting the weight so as to be capable of vibrating within the damper case is separate and different from the cushion member.

Further, according to an eleventh aspect of the present invention, in addition to the first aspect, an elastic support part is provided on the damper case as the mounting part, the elastic support part being snap fitted onto the frame for retaining the damper case.

Furthermore, according to a twelfth aspect of the present invention, in addition to the eleventh aspect, the frame has first and second frame members that are adjacent to each other, and first and second elastic support parts are provided on the damper case, the first and second elastic support parts being snap fitted onto the first and second frame members so as to grip them.

Moreover, according to a thirteenth aspect of the present invention, in addition to the twelfth aspect, the first and second elastic support parts are disposed so as to sandwich the center of gravity of the weight.

Further, according to a fourteenth aspect of the present invention, in addition to the twelfth or thirteenth aspect, each of the elastic support parts is provided with a major arc-shaped gripping claw that can elastically deform so as to elastically grip a corresponding frame member.

Furthermore, according to a fifteenth aspect of the present invention, in addition to the fourteenth aspect, the gripping claws of the first and second elastic support parts have internal diameters that are different from each other.

Moreover, according to a sixteenth aspect of the present invention, in addition to the fifteenth aspect, the gripping claws of the first and second elastic support parts have stiffnesses that are different from each other.

Further, according to a seventeenth aspect of the present invention, in addition to the twelfth aspect, the frame has first and second frame members that are parallel to each other and a third frame member that links the first and second frame members, and the damper case is provided with a positioning support part that engages with the third frame member so as to define gripping positions at which the first and second frame members are gripped by the first and second elastic support parts.

Furthermore, according to an eighteenth aspect of the present invention, in addition to the seventeenth aspect, the first and second elastic support parts are formed on the first case half of the damper case, the first and second elastic support parts engaging with the first and second frame members from a direction opposite to the position of the first case half, and the positioning support part is formed on the second case half, the positioning support part abutting against the third frame member from a direction opposite to the position of the second case half.

Moreover, according to a nineteenth aspect of the present invention, in addition to any one of the fourteenth to sixteenth aspects, each of the elastic support parts has an arm extending from the damper case and supporting the gripping claw, and a stopper is formed on the damper case, the stopper restricting flexure of the arm toward the side opposite to an opening part of the gripping claw.

Further, according to a twentieth aspect of the present invention, in addition to any one of the fourteenth to eighteenth aspects, the gripping claw is provided with a window hole that enables the frame member gripped by the gripping claw to be viewed.

Furthermore, according to a twenty-first aspect of the present invention, in addition to the eleventh aspect, the damper case is provided with a plurality of the elastic support parts so that the elastic support parts occupy positions at apexes of a polygon surrounding the center of gravity of the weight.

Moreover, according to a twenty-second aspect of the present invention, in addition to the eleventh aspect, the damper case and the frame supporting the damper case are embedded in a cushion member formed from a foam material, and the damper case is disposed at a position offset toward one side from a pouring inlet for the foam material in the cushion member.

Further, according to a twenty-third aspect of the present invention, in addition to the eleventh aspect, a headrest of the seat is formed from a headrest frame supported on an upper end part of a seat back and a cushion member formed from a foam material and having an upper part of the headrest frame embedded therein, and the damper case is retained on the headrest frame via the elastic support part provided on the damper case and is embedded in the cushion member.

Furthermore, according to a twenty-fourth aspect of the present invention, in addition to the first aspect, the dynamic damper is attached to a standing part, which includes the seat back, of the seat, and a rear face of the weight of the dynamic damper is formed as a protruding curved face having a larger curvature than that of a front face of the weight.

Moreover, according to a twenty-fifth aspect of the present invention, in addition to the twenty-fourth aspect, the front face is formed as a protruding curved face having a smaller curvature than that of the rear face.

Further, according to a twenty-sixth aspect of the present invention, in addition to the twenty-fourth or twenty-fifth aspect, the weight is formed so that the center of gravity is displaced further upward than the center of the weight.

Furthermore, according to a twenty-seventh aspect of the present invention, in addition to the first aspect, a front wall of the dynamic damper that faces a seated person side is formed so as to be flat, whereas a rear wall on the side opposite thereto is formed so as to have a convex shape.

Moreover, according to a twenty-eighth aspect of the present invention, in addition to the twenty-seventh aspect, a standing part is formed from a seat back and a headrest supported on an upper end part of the seat back, and the damper case is embedded in a cushion member of the headrest, the front wall of the damper case being formed into a protruding curved face following a front face of the headrest.

Further, according to a twenty-ninth aspect of the present invention, in addition to the eleventh aspect, the elastic support parts are formed so that push-in directions for snap fitting onto the frame are the same direction.

Furthermore, according to a thirtieth aspect of the present invention, in addition to the twenty-ninth aspect, the headrest frame has first and second frame members that are parallel to each other and a third frame member linking the first and second frame members, a pair of elastic support parts snap fitted onto the first and second frame members are provided on the damper case, and the pair of elastic support parts are formed so that push-in directions for snap fitting onto the first and second frame members are directed from the outside to the inside of the headrest frame.

Moreover, according to a thirty-first aspect of the present invention, in addition to the thirtieth aspect, the damper case is provided with a positioning support part that engages with and abuts against the third frame member to define a snap fitting position of the first and second elastic support parts onto the first and second frame members.

Further, according to a thirty-second aspect of the present invention, in addition to the thirty-first aspect, the elastic support part and the positioning support part are formed integrally with one of the first and second case halves forming the damper case.

Furthermore, according to a thirty-third aspect of the present invention, in addition to the thirty-second aspect, the elastic support part and the positioning support part are formed so that the push-in direction of the elastic support part relative to the first and second frame members is the same as the push-in direction of the positioning support part relative to the third frame member.

Moreover, according to a thirty-fourth aspect of the present invention, in addition to the first aspect, the mounting part is formed as a type that is variable according to at least one of change in distance and change in angle between the frame and the damper case.

Effects of the Invention

In accordance with the first aspect of the present invention, since the dynamic damper is formed from the damper case that includes the first and second case halves joined together so that they can be separated from each other and defining the damper chamber in the interior, the weight housed in the damper chamber, and the elastic member disposed between the weight and the inner face of the damper chamber so as to allow vibration of the weight, it is possible to open the damper chamber by separating the damper case into the first and second case halves even after the dynamic damper has been assembled and to easily carry out adjustment and alteration of the damping characteristics of the dynamic damper by exchanging the weight and the elastic member in the interior of the damper chamber for ones having different characteristics.

Furthermore, since the damper case is provided with the mounting part mounted on the frames, it is possible to easily mount the damper case on the frame via the mounting part without using a special mounting implement such as a band.

In accordance with the second aspect of the present invention, since the plurality of pairs of elastic linking claws and linking holes, which snap fit together to thus join the first and second case halves, are formed on one and the other of the two case halves, it is possible to snap fit the plurality of pairs of elastic linking claws and linking holes merely by abutting the two case halves against each other, thus enabling the two case halves to be easily joined, and after joining it is also possible to separate the two case halves by subjecting the elastic linking claws to elastic deformation to thus disengage them from the linking holes.

In accordance with the third aspect of the present invention, since the plurality of pairs of elastic linking claws and linking holes are disposed at positions sandwiching the weight, it is possible to support effectively the vibrational impact force of the weight on the plurality of pairs of elastic linking claws and linking holes, thereby preventing effectively deformation of the first and second case halves.

In accordance with the fourth aspect of the present invention, since the elastic member is formed from an elastic sheet, and this elastic sheet is disposed in a compressed state between the outer face of the weight and the inner face of the damper chamber opposing the outer face, it is possible to prevent displacement of the elastic sheet in the interior of the damper chamber, thus enabling the weight to be always held at a predetermined position and thereby suppressing unnecessary movement of the weight so as to guarantee a predetermined damping function.

In accordance with the fifth aspect of the present invention, since one and the other of the mating faces of the first and second case halves are provided with the mating groove and the mating projecting wall, which can be fitted together while surrounding the damper chamber, it is possible by the labyrinth effect due to the mating projecting wall fitting into the mating groove to prevent effectively foreign matter from entering the damper chamber between the mating faces of the first and second case halves, thereby enabling an appropriate damping function of the weight and the elastic member to be maintained over a long period. In particular, the headrest in which the dynamic damper is embedded in the cushion member made of a foam material is very effective since it is possible to prevent the foam material from entering the damper chamber.

In accordance with the sixth aspect of the present invention, since the end wall of at least one of the first and second case halves is curved so as to protrude outwardly, it is possible by means of the outwardly protruding curved end wall not only to enhance the stiffness of the damper case but also to increase the size of the weight due to the enlarged volume of the damper chamber, thereby contributing to an improvement in the damping function.

In accordance with the seventh aspect of the present invention, since the damper case is mounted on the frame of at least one of the seat back and the headrest, and the weight within the damper case is formed so that the center of gravity of the weight is positioned above the center of the weight in the vertical direction, the center of gravity of the weight occupies a position as far as possible from the support point of the vibration system formed from the seat cushion and the headrest, thereby enabling the damping function of the dynamic damper to be enhanced with a weight having a relatively small mass.

In accordance with the eighth aspect of the present invention, since the gap between the side face of the weight and the inside face of the damper chamber opposing the side face with the elastic member sandwiched therebetween increases in going away from the support point of the vibration system having the dynamic damper mounted thereon, the amplitude of vibration of the weight increases in going away from the support point of the vibration system, thus enabling the damping effect to be enhanced.

In accordance with the ninth aspect of the present invention, since the outside face of the case half on the side having the linking hole is provided with the recess part that receives the claw part of the elastic linking claw engaged with the linking hole, in a state in which the dynamic damper is assembled the elastic linking claw does not project from the outer face of the damper case, and handling of the dynamic damper becomes easy.

In accordance with the tenth aspect of the present invention, since the head rest of the seat is formed from the headrest frame supported on the upper end part of the seat back and the cushion member formed from a foam material in which the upper part of the headrest frame is embedded, and the damper case is retained on the headrest frame via the mounting part and embedded in the cushion member, the dynamic damper occupies a position as far as possible from the support point of the vibration system formed from the seat cushion and the headrest, thereby enabling a damping function to be imparted to the dynamic damper with a weight having a relatively small mass. Moreover, not only is it possible to prevent the foam material from entering the damper case when molding the cushion member from the foam material, thus preventing the damping characteristics of the weight and the elastic member from being impaired, but it is also possible to suppress by means of the damper case transmission of vibration of the weight to the cushion member, thus ensuring that a disagreeable sensation is not given to an occupant.

In accordance with the eleventh aspect of the present invention, the dynamic damper is formed from the weight and the damper case supporting this weight via the elastic member, and the damper case is provided with the elastic support part snap fitted onto the seat frame to retain the damper case thereon, thus making it possible to simply and easily mount the damper case on the seat frame without using screws, etc.

In accordance with the twelfth aspect of the present invention, the first and second frame members of the frame that are adjacent to each other are provided, on opposite sides of the damper case, with the first and second elastic support parts that snap fit so as to grip them, the damper case is supported via at least two points on the opposite sides thereof, and the state in which it is mounted can be stabilized.

In accordance with the thirteenth aspect of the present invention, by disposing the first and second elastic support parts so as to sandwich the center of gravity of the weight, the vibrational impact force of the weight is efficiently transmitted to the first and second elastic support parts via the damper case, thereby stabilizing the damper case.

In accordance with the fourteenth aspect of the present invention, each elastic support part is provided with the major arc-shaped gripping claw that can undergo elastic deformation so as to elastically grip the corresponding frame member, and the gripping claw can be reliably snap fitted onto the frame member without subjecting the frame member to special machining.

In accordance with the fifteenth aspect of the present invention, due to the internal diameters of the gripping claws of the first and second elastic support parts being different from each other, any manufacturing error resulting in a difference between the distance between the centers of the parallel first and second frame members and the distance between the centers of the gripping claws of the first and second elastic support parts can be absorbed by relatively small elastic deformation of the gripping claws, and the two gripping claws can be easily and reliably mounted on the two frame members in spite of the manufacturing error.

In accordance with the sixteenth aspect of the present invention, due to the stiffnesses of the gripping claws of the first and second elastic support parts being different from each other, the two gripping claws can be more easily and reliably mounted on the two frame members in spite of the manufacturing error.

In accordance with the seventeenth aspect of the present invention, due to there being provided on the damper case the positioning support part that engages with the third frame member linking the first and second frame members and defines the gripping position of the first and second elastic support parts relative to the first and second frame members, it is possible to easily determine a predetermined position of the damper case on the frame.

In accordance with the eighteenth aspect of the present invention, the first and second elastic support parts engaging with the first and second frame members from the direction opposite to the position of the first case half are formed on the first case half, and the positioning support part abutting against the third frame member from the direction opposite to the position of the second case half is formed on the second case half, thus ensuring that the vibrational impact force of the weight does not act in a direction that separates the first and second case halves and thereby preventing the damper case from coming apart due to the vibrational impact force of the weight.

In accordance with the nineteenth aspect of the present invention, since each elastic support part has the arm extending from the damper case and supporting the gripping claw, it is possible by selection of the length of the arm to make the distance between the centers of the two gripping claws coincide with the distance between the centers of the two frame members, thus enabling the gripping claws to reliably engage with the two frame members. Moreover, since the stopper for restricting flexure of the arm toward the side opposite to the opening part of the gripping claw is formed on the damper case, even if a large load acts on the damper case in the direction in which the gripping claw engages with the frame member, the stopper abuts against the arm to thus restrict flexure of the arm, thereby restricting unnecessary movement of the damper case.

In accordance with the twentieth aspect of the present invention, due to the gripping claw being provided with the window hole through which the frame member gripped thereby is visually identified, it is possible to visually confirm through the window hole of the gripping claw whether or not the state of engagement of the gripping claw with the frame member is appropriate.

In accordance with the twenty-first aspect of the present invention, due to the plurality of elastic support parts being provided on the damper case so as to occupy positions at the apexes of a polygon surrounding the center of gravity of the weight, it is possible to disperse the vibrational impact force of the weight substantially equally among all the elastic support parts via the damper case, thus suppressing effectively vibration of the damper case and contributing to an improvement in the ride comfort.

In accordance with the twenty-second aspect of the present invention, since the damper case and the frame supporting same are embedded in the cushion member formed from a foam material, it is possible, when molding the cushion member using a foam material, to prevent the foam material from entering the damper case and impairing the damping characteristics of the weight and the elastic member. Moreover, since the damper case is disposed at a position that is offset toward one side from the pouring inlet for the foam material in the cushion member, the pressure of pouring the foam material into the foam material pouring inlet does not act directly on the dynamic damper, and it is therefore possible to prevent the dynamic damper from becoming disengaged from the frame of the elastic support part due to the pour-in pressure.

In accordance with the twenty-third aspect of the present invention, since the headrest of the seat is formed from the headrest frame supported on the upper end part of the seat back and the cushion member made of a foam material in which the upper part of the headrest frame is embedded, and the damper case is retained by the headrest frame via the elastic support part provided on the damper case and embedded in the cushion member, the dynamic damper occupies a position as far as possible from the support point of the vibration system formed from the seat cushion and the headrest, and it is therefore possible to impart a damping function to the dynamic damper with a weight having a relatively small mass. Moreover, when molding the cushion member using a foam material, not only is it possible to prevent the foam material from entering the damper case and impairing the damping characteristics of the weight and the elastic member, but it is also possible by means of the damper case to suppress transmission of vibration of the weight to the cushion member, thus ensuring that a disagreeable sensation is not given to an occupant.

In accordance with the twenty-fourth aspect of the present invention, since the dynamic damper is attached to the standing part, including the seat back, of the seat, and the rear face of the weight of the dynamic damper is formed into a protruding curved face that has a greater curvature than that of the front face of the weight, it is possible to easily carry out molding while ensuring the heaviness of the weight.

In accordance with the twenty-fifth aspect of the present invention, since the front face of the weight is formed into a protruding curved face that has a smaller curvature than that of the rear face, it is possible to increase the heaviness of the weight by a portion corresponding to the bulge of the front face, thus enhancing the damping function of the dynamic damper.

In accordance with the twenty-sixth aspect of the present invention, since the weight is formed so that the center of gravity thereof is displaced upwardly from the center of the weight, the center of gravity of the weight is as far as possible from the support point of the standing part of the seat, and it is therefore possible for the dynamic damper to exhibit an effective damping function for the standing part with a weight having a relatively small mass.

In accordance with the twenty-seventh aspect of the present invention, since the front wall of the dynamic damper facing the seated person side is formed as a flat shape, and the rear wall on the side opposite thereto is formed as a convex shape, when the weight vibrates, transmission of the vibration to the cushion member is suppressed by the damper case, and a disagreeable sensation is not given to the seated person.

Furthermore, even when the thickness of the cushion member in front of the damper case is small, since the front face directed toward the seated person side of the damper case is formed as a flat shape, even if the seated person is strongly pressed against the cushion member in front of the damper case due to an impact or a reaction, since the front wall of the damper case directed toward the seated person side is formed as a flat shape, the damper case supports the seated person over a relatively wide area, thus suppressing as much as possible any increase in the pressure acting on the seated person and thereby eliminating or alleviating any disagreeable sensation given to the seated person by the damper case.

On the other hand, since the rear face of the damper case is formed as a convex shape, it is possible to ensure that there is sufficient volume for the interior of the damper case, thereby enabling a weight having a desired heaviness to be housed and the damping function of the dynamic damper to be enhanced.

In accordance with the twenty-eighth aspect of the present invention, since the standing part is formed from the seat back and the headrest supported on the upper end part thereof, and the damper case is embedded in the cushion member of the headrest, the center of gravity of the weight occupies a position far above the support position for the standing part of the seat, and it is therefore possible for the dynamic damper to exhibit an effective damping function toward the standing part with a weight having a relatively small mass.

Furthermore, when the damper case is embedded in the cushion member of the headrest, the damper case can prevent the cushion member from entering its interior, and it is possible to prevent the damping characteristics of the dynamic damper from deviating due to such entry.

Moreover, since the front wall of the damper case is formed as a protruding curved face that follows the front face of the headrest, it is possible to make the thickness of the cushion member in front of the damper case constant, thereby improving the feel for a seated person when they contact the front face of the cushion member. Furthermore, because of the bulge of the front wall of the damper case, the volume increases, and the heaviness of the weight can be increased accordingly, thus improving the damping function.

In accordance with the twenty-ninth aspect of the present invention, since the plurality of elastic support parts are formed so that the push-in directions for snap fitting onto the frame are the same direction, it is possible to snap fit the plurality of elastic support parts onto the seat frame at the same time, thus speeding up the operation of mounting the damper support.

In accordance with the thirtieth aspect of the present invention, since the headrest frame has the first and second frame members arranged in parallel to each other and the third frame member linking these first and second frame members, the damper support is provided with the pair of elastic support parts snap fitted onto the first and second frame members, and the pair of elastic support parts are formed so that the push-in direction for snap fitting onto the first and second frame members goes from the outside toward the inside of the headrest frame, it is possible by pushing in the damper support from the outside toward the inside of the headrest frame to snap fit the pair of elastic support parts onto the first and second frame members of the headrest frame at the same time.

In accordance with the thirty-first aspect of the present invention, since the damper case is provided with the positioning support part, which engages with and abuts against the third frame member to thus define the snap fitting position of the first and second elastic support parts relative to the first and second frame members, it is possible to simply determine a predetermined position for the damper support on the headrest frame.

In accordance with the thirty-second aspect of the present invention, since the elastic support part and the positioning support part are formed integrally with one of the first and second case halves forming the damper case, it is possible to form the elastic support part and the positioning support part on one of the first and second case halves at the same time. In this process, although the one case half having the elastic support part and the positioning support part has a complicated shape, since the shape of the other case half is simplified, overall it is possible to easily carry out molding of the first and second case halves.

In accordance with the thirty-third aspect of the present invention, since the elastic support part and the positioning support part are formed so that the push-in direction of the elastic support part relative to the first and second frame members is the same as the push-in direction of the positioning support part relative to the third frame member, it is possible to simultaneously carry out snap fitting of the elastic support part onto the first and second frame members and engagement and abutment of the positioning support part against the third frame member, thus speeding up the operation of mounting the damper support.

In accordance with the thirty-fourth aspect of the present invention, since the mounting part is formed as a variable type so as to correspond to at least one of variation in the distance and the angle between the frame and the damper case, it is possible to mount a common dynamic damper on a plurality of types of seat having different frame specifications, thereby enhancing the multi-purpose features of the dynamic damper and reducing the cost.

BRIEF DESCRIPTION OF DRAWINGS

FIG. 21 is a view, corresponding to FIG. 18, showing an eleventh embodiment of the present invention. (eleventh embodiment)

FIG. 24 is a view, corresponding to FIG. 23, showing a different mounting mode for a dynamic damper in the twelfth embodiment. (twelfth embodiment)

EXPLANATION OF REFERENCE NUMERALS AND SYMBOLS

Figure 1:
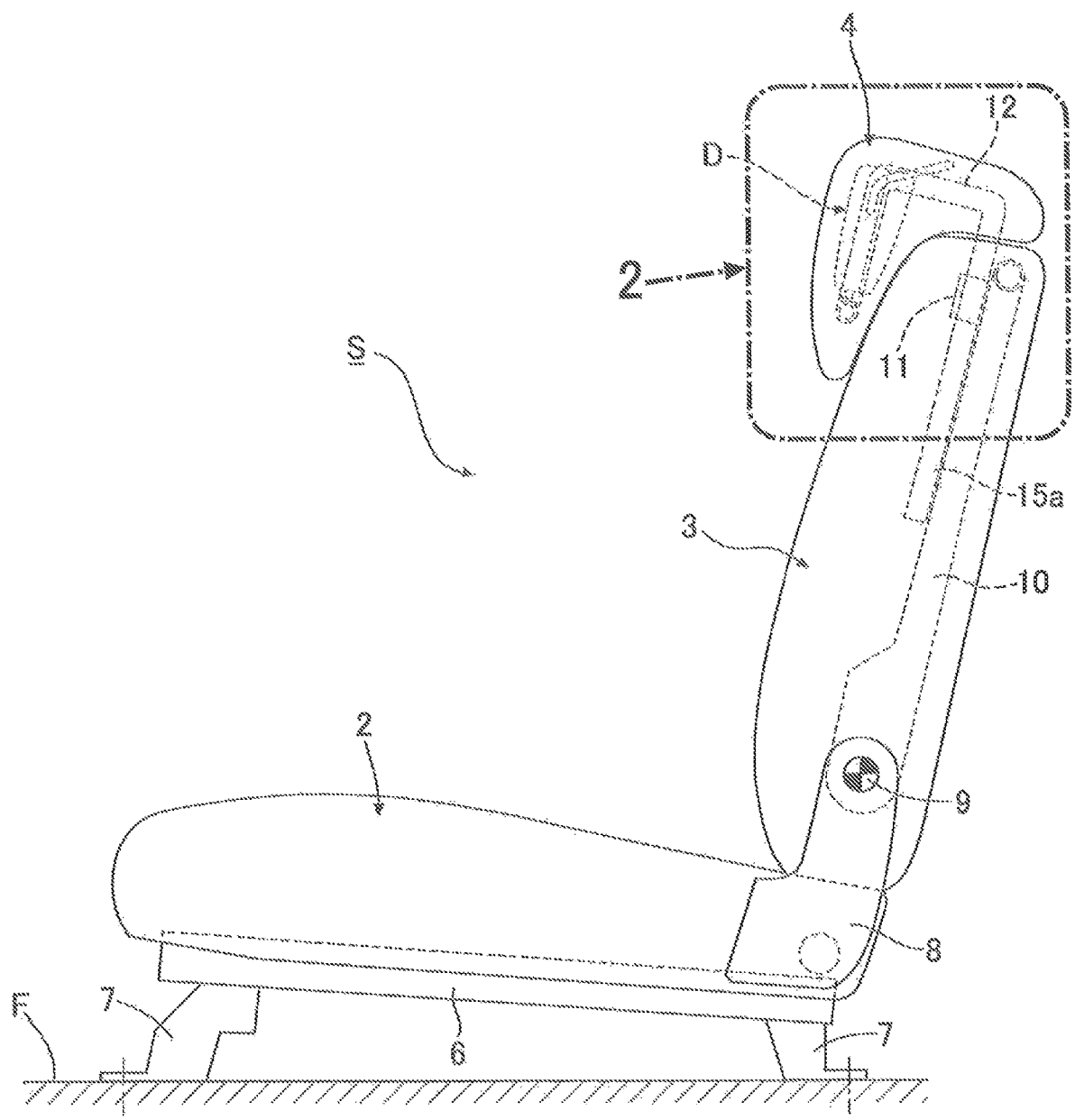
FIG. 1 is a side view of a seat device for an automobile related to a first embodiment of the present invention. (first embodiment)

C Center in vertical direction of weight
D Dynamic damper
G Center of gravity of weight
S Seat
2 Seat cushion
3 Seat back
4 Headrest
6 Seat cushion frame
10 Seat back frame
12 Headrest frame
15 Weight
16 Elastic member (elastic sheet)
17 Damper case
17A First case half
17B Second case half
17C Damper chamber
17f Damper chamber end wall (front wall)
17r Damper chamber end wall (rear wall)
20 Mating groove
21 Mating projecting wall
22 Elastic linking claw
23 Linking hole
23a Recess portion
24A, 24B, 24C Mounting part (elastic support member)
50 Mounting part (elastic support member)

MODES FOR CARRYING OUT THE INVENTION

A first embodiment of the present invention shown in FIG. 1 to FIG. 8 is now explained. In the explanation below, fore-and-aft and left-and-right are with respect to an automobile to which the present invention is applied.

First Embodiment

In FIG. 1, a seat S for an automobile is formed from a seat cushion 2, a seat back 3, and a headrest 4. The seat cushion 2 has a seat cushion frame 6 having formed in a lower part a plurality of support legs 7 and 7, and the support legs 7 and 7 are fixed to a floor F of the automobile.

A pair of left and right brackets 8, which project upwardly, are provided so as to be connected to a rear end part of the seat cushion frame 6, and a seat back frame 10 of the seat back 3 is linked to the brackets 8 via a pivot shaft 9 so that it can recline.

Furthermore, a pair of left and right support tubes 11 and 11 are fixedly provided on an upper end part of the seat back frame 10, and the headrest 4 is supported by these support tubes 11 and 11 so that it can be raised, lowered, and fixed.

As shown in FIG. 2 to FIG. 6, the headrest 4 is formed into a teardrop shape, including a headrest frame 12, a urethane foam cushion member 13 supported on the frame, a surface skin or cover 14 covering the external surface of the cushion member, and a dynamic damper D which is mounted on the headrest frame 12.

Figure 2:
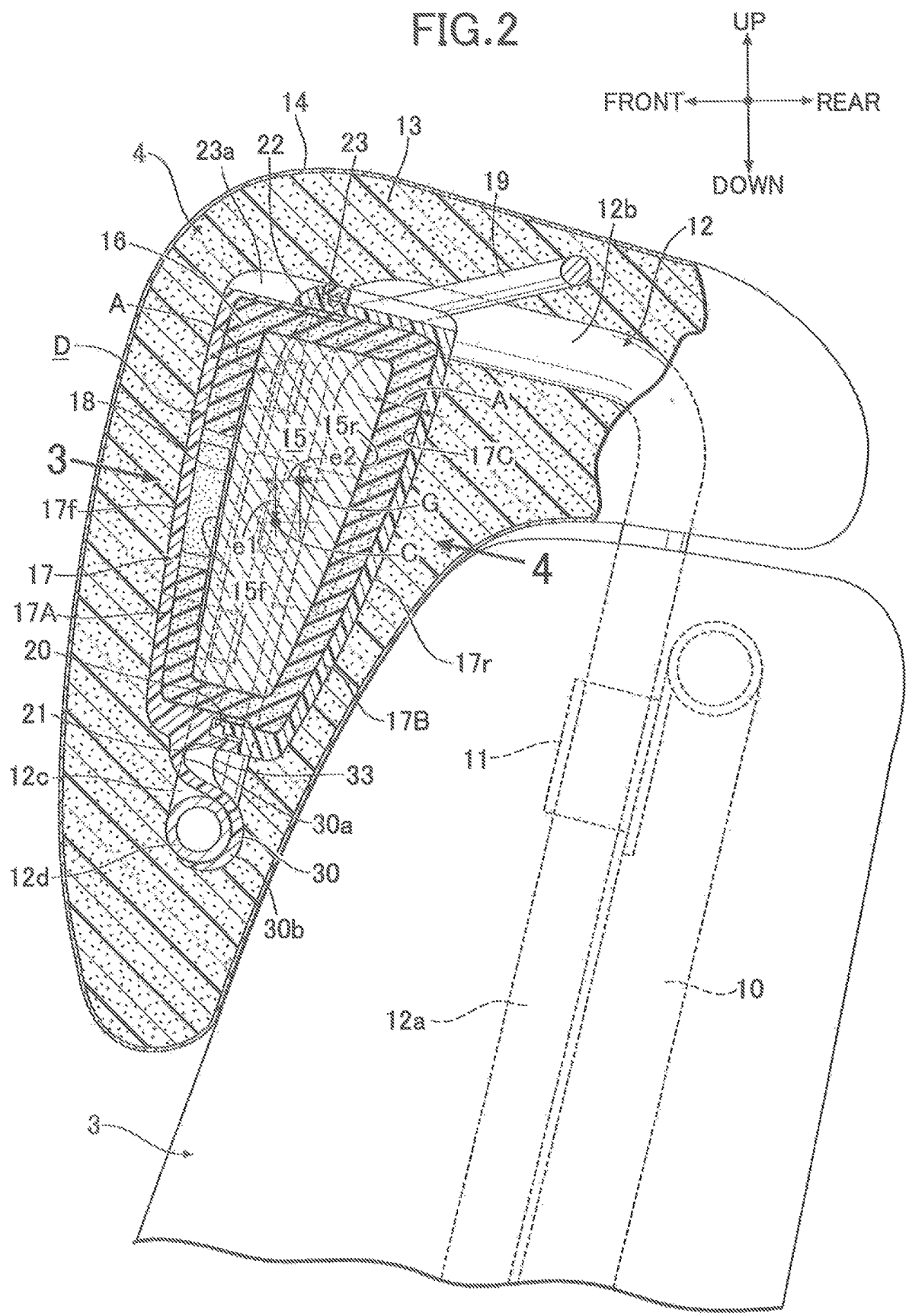
FIG. 2 is an enlarged view of part 2 in FIG. 1 (area around headrest). (first embodiment)
Figure 3:
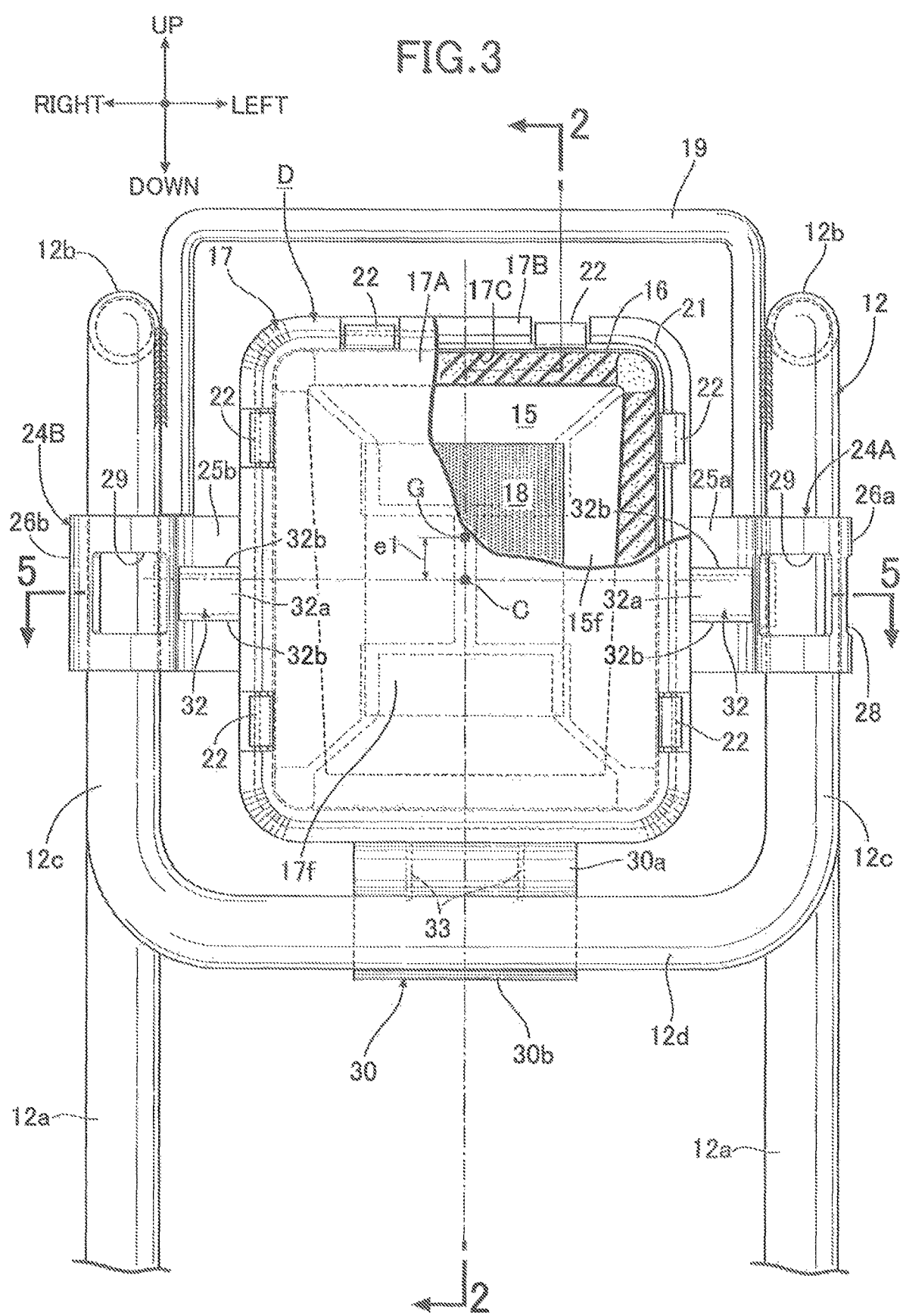
FIG. 3 is a view in the direction of arrow 3 in FIG. 2. (first embodiment)
Figure 4:
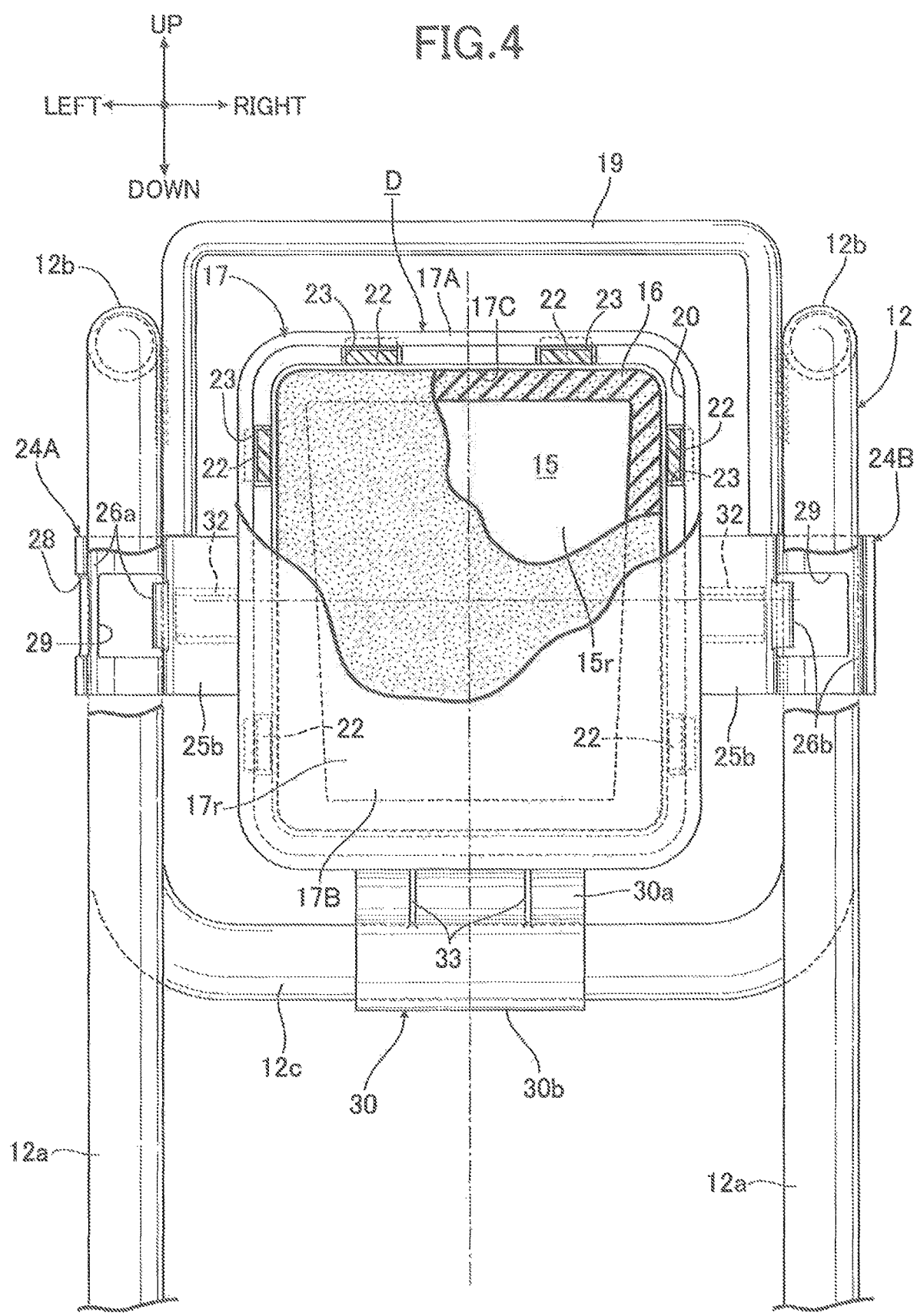
FIG. 4 is a view in the direction of arrow 4 in FIG. 2. (first embodiment)
Figure 6:
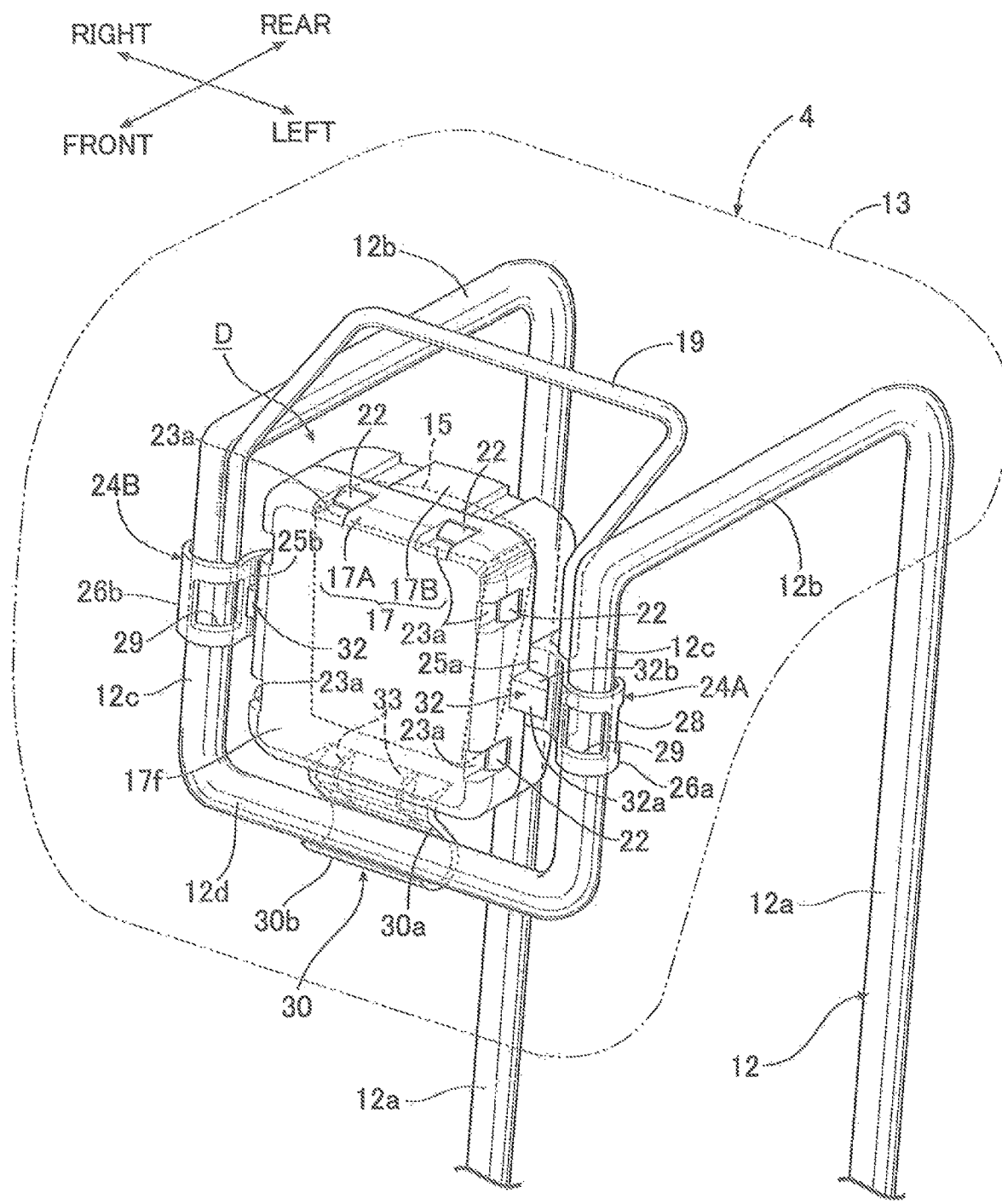
FIG. 6 is a perspective view corresponding to FIG. 3. (first embodiment)

The headrest frame 12 is formed by bending a pipe material, and includes a pair of left and right main frame members 12a and 12a supported on the pair of support tubes 11 and 11, upper frame members 12b and 12b bending forwardly from the upper ends of the main frame members 12a and 12a, a pair of left and right front vertical frame members 12c and 12c extending while bending downwardly from the front lower ends of the upper frame members 12b and 12b, and a front horizontal frame member 12d integrally linking lower end parts of the front vertical frame members 12c and 12c to each other. As seen in FIGS. 2 and 6, the frame 12 is configured and disposed so as to be spaced away from a portion of the seat device between an upper face of the damper case 17, discussed below, and an inner face of the cover 14 that opposes the damper case's upper face. A reinforcing crossbar 19 having a smaller diameter than that of the pipe material of the frame 12 is welded so as to bridge the left and right front vertical frame members 12c and 12c. The cushion member 13 is formed so as to wrap around the headrest frame 12 from upper parts of the main frame members 12a and 12a to the front horizontal frame member 12d, and the cushion member 13 is covered by the surface skin or cover 14.

Before forming the cushion member 13, the dynamic damper D is mounted by utilizing the front vertical frame members 12c and 12c and the front horizontal frame member 12d. The vertical frame members 12c, 12c may also be considered to be additional main frame members, separate from the main frame members 12a, 12a discussed above. The dynamic damper D is formed from a weight 15, an elastic sheet 16 wrapped around the weight 15 so as to be superimposed on all of the faces thereof, and a damper case 17 having a damper chamber C formed therein and housing the weight 15 and the elastic sheet 16, the weight 15 being supported in all directions on the damper case 17 via the elastic sheet 16. As will be understood from a consideration of FIGS. 1, 2 and 6, first and second mounting parts 24a, 24b are engaged with the front vertical frame members 12c and 12c, and the weight 15 and the front vertical frame members 12c and 12c are disposed so as to overlap with each other in the up-down direction of the seat, in a manner such that a common plane passes through both the weight and the front vertical frame members 12c and 12c (main frame members).

Figure 5:
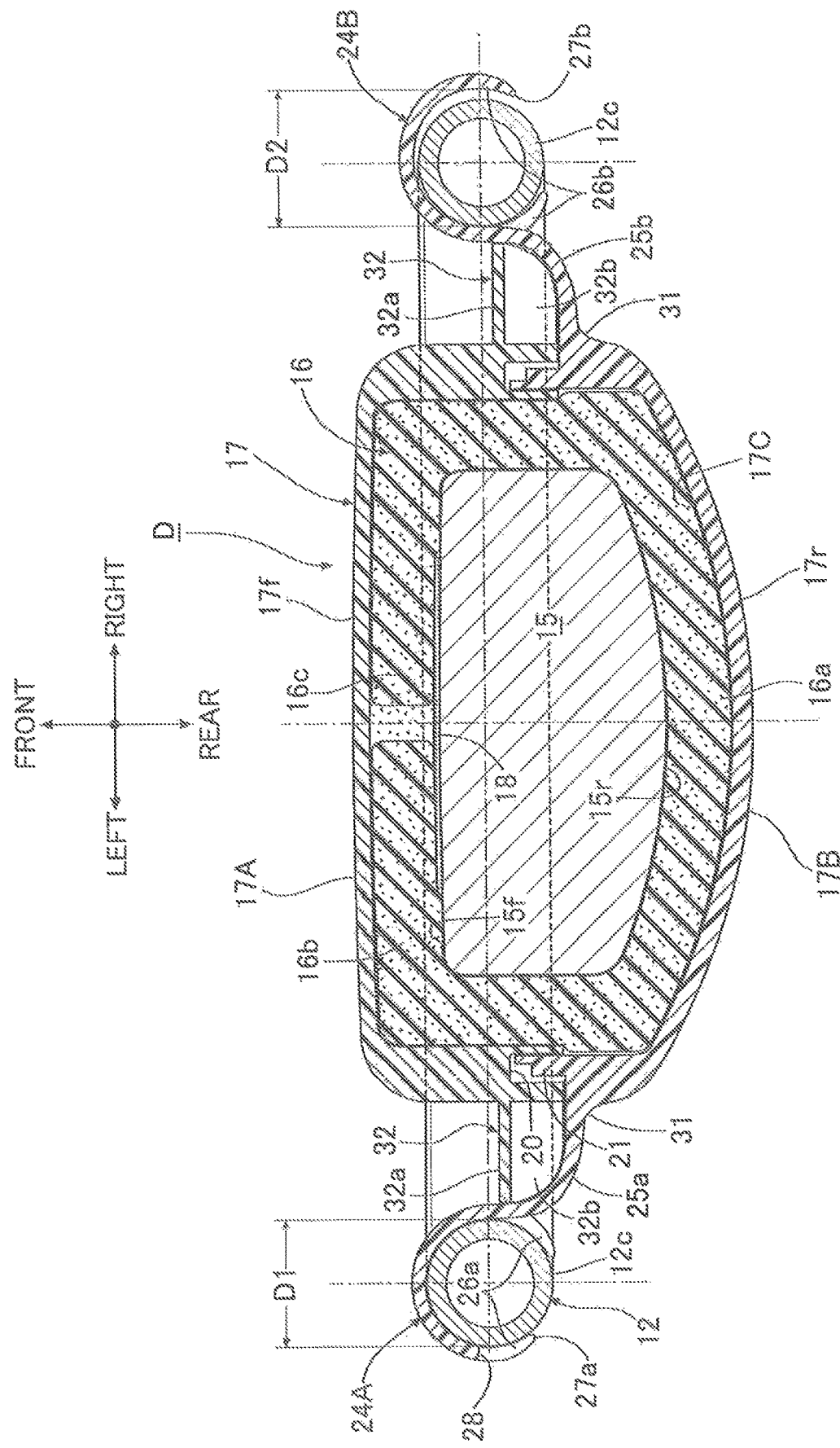
FIG. 5 is a sectional view along line 5-5 in FIG. 3. (first embodiment)
Figure 7:
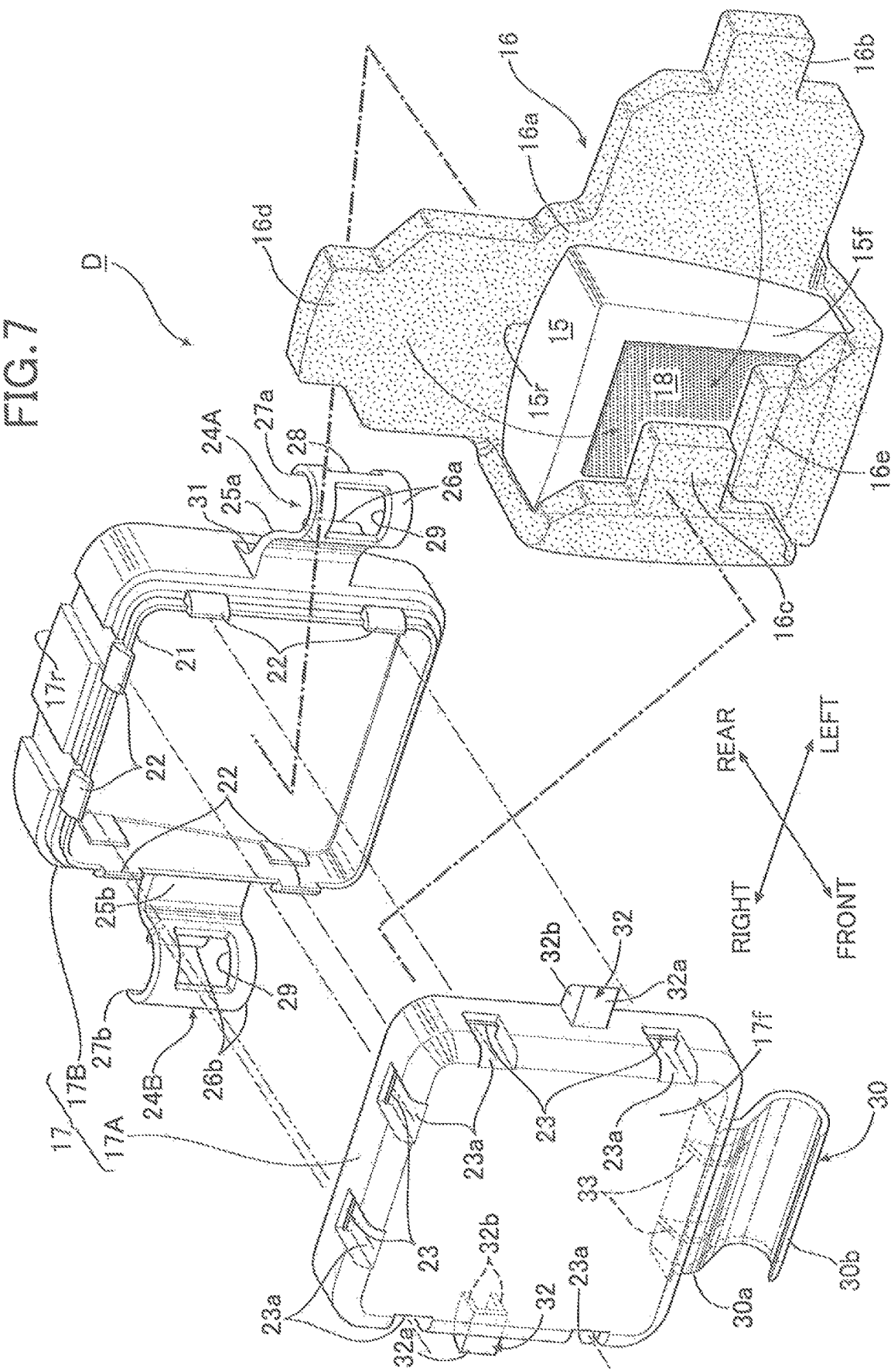
FIG. 7 is an exploded perspective view of a dynamic damper in FIG. 6. (first embodiment)

As is clearly shown in FIG. 2, FIG. 5, and FIG. 7, the weight 15 is made of cast iron and is a hexahedron that is flat in the fore-and-aft direction, its front face 15f is formed into a protruding curved face that is close to a flat face, and its rear face 15r is formed into a curved face that protrudes rearwardly and to a greater extent than the front face 15f. Furthermore, the weight 15 is formed so as to gradually increase in thickness in the fore-and-aft direction in going upward and also gradually increase in width in the left-and-right direction in going upward; this makes the center of gravity G of the weight 15 be displaced from the center C of the weight 15 by e1 to the top and by e2 to the rear. This weight 15 forms an inverted trapezoidal shape when viewed from the front.

The elastic sheet 16 is made of a urethane foam in which four sheet pieces 16b to 16e protrude from a rectangular central portion 16a corresponding to the rear face 15r of the weight; when wrapping the elastic sheet 16 around the weight 15, after the front face 15f of the weight 15 is placed on the central portion 16a of the elastic sheet 16, the four sheet pieces 16b to 16e are each made to rise, folded toward the rear face 15r of the weight 15, and adhered to the front face 15f via double-sided adhesive tape 18. The weight 15 thus wrapped with the elastic sheet 16 is housed within the damper case 17, which is split into two in the fore-and-aft direction. The elastic sheet 16 is disposed in a compressed state between an outer face of the weight 15 and an inner face of the damper chamber C opposing the outer face. This makes it possible to prevent the elastic sheet 16 from being displaced within the damper chamber C, thus enabling the weight 15 to always be held at a predetermined position, and suppresses unnecessary movement of the weight 15, thus guaranteeing a predetermined damping function.

As shown in FIG. 2 to FIG. 7, the damper case 17 has a shape that is similar to the external shape of the weight 15; it therefore has a box shape that is flat in the fore-and-aft direction, its front wall 17f is formed as a curved face that is close to a flat face so as to correspond to the front face 15f of the weight 15, and its rear wall 17r is formed into a curved face that projects rearwardly by a large amount so as to correspond to the rear face 15r of the weight 15.

The damper case 17 is divided into two, that is, a first case half 17A on the front side and a second case half 17B on the rear side, and the damper chamber C is defined between the first and second case halves 17A and 17B, the damper chamber C being capable of housing the weight 15 wrapped with the elastic sheet 16. The case halves 17A and 17B are each molded using a synthetic resin.

The first and second case halves 17A and 17B are formed so that a gap A (see FIG. 2) between a side face that follows the vertical direction of the weight 15 and an inside face of the damper chamber C that opposes the side face with the elastic sheet 16 sandwiched therebetween increases in going upward. That is, the gap A increases in going away from the support point 9 of a vibration system formed from the seat back 3 and the headrest 4. In the case of the illustrated example, in order to emphasize damping of fore-and-aft vibration of the vibration system, the first and second case halves 17A and 17B are formed so that the gap A in the fore-and-aft direction between the weight 15 and the inner face of the damper chamber C increases in a direction that goes away from the support point 9, that is, in going upward.

Furthermore, a mating groove 20 and a mating projecting wall 21 are provided on one and the other of mating faces of the two case halves 17A and 17B, the mating groove 20 and the mating projecting wall 21 surrounding the damper chamber C and being capable of being fitted together, a plurality of elastic linking claws 22 projecting outwardly are formed at the extremity of the mating projecting wall 21, and a plurality of linking holes 23 that the elastic linking claws 22 can elastically snap fit into are formed in the bottom of the mating groove 20. The plurality of pairs of elastic linking claws 22 and linking holes 23 are disposed on left and right side walls of the first and second case halves 17A and 17B opposing each other with the weight 15 sandwiched therebetween, and are also disposed on upper walls of the first and second case halves 17A and 17B.

A plurality of recess portions 23a are formed on the outside face of the case half on the side having the linking holes 23, the first case half 17A in the illustrated example, the recess portions 23a receiving claw parts of the elastic linking claws 22 engaging with the linking holes 23. Therefore, the elastic linking claws 22 do not project from the outer face of the damper case 17, and handling of the dynamic damper D becomes easy.

First and second elastic support parts 24A and 24B are formed integrally with left and right side walls of the second case half 17B. These first and second elastic support parts 24A and 24B are formed from plate-shaped arms 25a and 25b projecting outwardly from the left and right side walls of the second case half 17B and major arc-shaped gripping claws 26a and 26b connectedly provided at the extremity of the arms 25a and 25b and capable of snap fitting onto the front vertical frame members 12c and 12c so as to grip them. That is, the major arc-shaped gripping claws 26a and 26b can elastically grip the front vertical frame members 12c and 12c over more than half the periphery thereof. With regard to the major arc-shaped gripping claws 26a and 26b, opening portions 27a and 27b are directed rearwardly so as to engage with the front vertical frame members 12c and 12c from the front. Therefore, a rearward load from the head of an occupant acts in a direction in which the gripping claws 26a and 26b of the first and second elastic support parts 24A and 24B engage with the front vertical frame members 12c and 12c, thus preventing disengagement of the gripping claws 26a and 26b. Furthermore, it is possible, by selection of the length of the arms 25a and 25b, to make the distance between the centers of the gripping claws 26a and 26b coincide with the distance between the centers of the two front vertical frame members 12c and 12c, thereby enabling engagement of the gripping claws 26a and 26b with the front vertical frame members 12c and 12c to be appropriately carried out.

The major arc-shaped gripping claws 26a and 26b are formed so that their internal diameters D1 and D2 are different from each other. In the illustrated example, the internal diameter D2 of the gripping claw 26b of the second elastic support part 24B is set larger than the internal diameter D1 of the gripping claw 26a of the first elastic support part 24A. Furthermore, the major arc-shaped gripping claws 26a and 26b are formed so that their stiffnesses are different from each other. In the illustrated example, a cutout 28 is provided in an extremity part of the gripping claw 26a of the first elastic support part 24A so that the stiffness of the gripping claw 26a of the first elastic support part 24A is lower than that of the gripping claw 26b of the second elastic support part 24B, or the thickness of the gripping claw 26a is set to be thinner than that of the gripping claw 26b. Furthermore, the first and second elastic support parts 24A and 24B are disposed so as to sandwich the center of gravity G of the weight 15.

Moreover, each of the gripping claws 26a and 26b is provided with a window hole 29, and the state of engagement of the gripping claws 26a and 26b and the front vertical frame members 12c and 12c can be visually confirmed through the window hole 29.

On the other hand, a positioning support part 30 is formed integrally with a lower wall of the first case half 17A. This positioning support part 30 is formed from a plate-shaped arm 30a that projects downwardly from a lower wall of the first case half 17A and a U-shaped abutment claw 30b that is connectedly provided at the lower end of the arm 30a. The positioning support part 30 may be considered to be a third mounting part 30, and the abutment claw 30b thereof abuts against and engages with the front horizontal frame member 12d from the rear, so as to define the position at which the gripping claws 26a and 26b and the left and right front vertical frame members 12c and 12c are engaged. The mounting position for the damper case 17 on the headrest frame 12 is thus determined. In addition, as shown by FIGS. 1, 2 and 6, the weight 15 and the front horizontal frame member 12d are disposed so as to overlap with each other in the left-right direction of the seat, in a manner such that a common plane passes through both the weight and the horizontal frame member.

Formed on bases of the arms 25a, 25b and 30a of the first and second elastic support parts 24A, 24B and the positioning support part 30 is a thick part 31 for reinforcing the bases, and formed on the left and right side walls of the first case half 17A are a pair of stoppers 32 and 32 that abut against the arms 25a and 25b of the first and second elastic support parts 24A and 24B so as to restrict forward flexure thereof, that is, flexure of the arms 25a and 25b toward the side opposite to the opening portions 27a and 27b of the gripping claws 26a and 26b. Each stopper 32 is formed so as to have a squared U-shaped section from a middle wall portion 32a linearly abutting against a back face of the corresponding gripping claws 26a and 26b, and a pair of side wall portions 32b and 32b connected to opposite ends of the middle wall portion 32a and abutting against a curved face extending from the corresponding arms 25a and 25b to the back face of the gripping claws 26a and 26b. Since the stopper 32 thus arranged has high stiffness and can ensure that there is a wide abutment face against the back face of an area from the corresponding arms 25a and 25b to the gripping claws 26a and 26b, flexure of the arms 25a and 25b can be restricted effectively while avoiding the concentration of stress as much as possible. Therefore, even if a large rearward load acts on the damper case 17 from the head of an occupant, the stoppers 32 and 32 abut against the front faces of the arms 25a and 25b to thus restrict forward flexure of the arms 25a and 25b, thereby restricting unnecessary rearward movement of the damper case 17.

Since the stopper 32 is integrally linked to the outside wall of the mating groove 20, it can contribute to reinforcement of the outside wall of the mating groove 20.

Furthermore, formed on the arm portion 30a of the positioning support part 30 are a plurality of reinforcing ribs 33 linking the lower wall of the first case half 17A and the abutment claw 30b.

Figure 8:
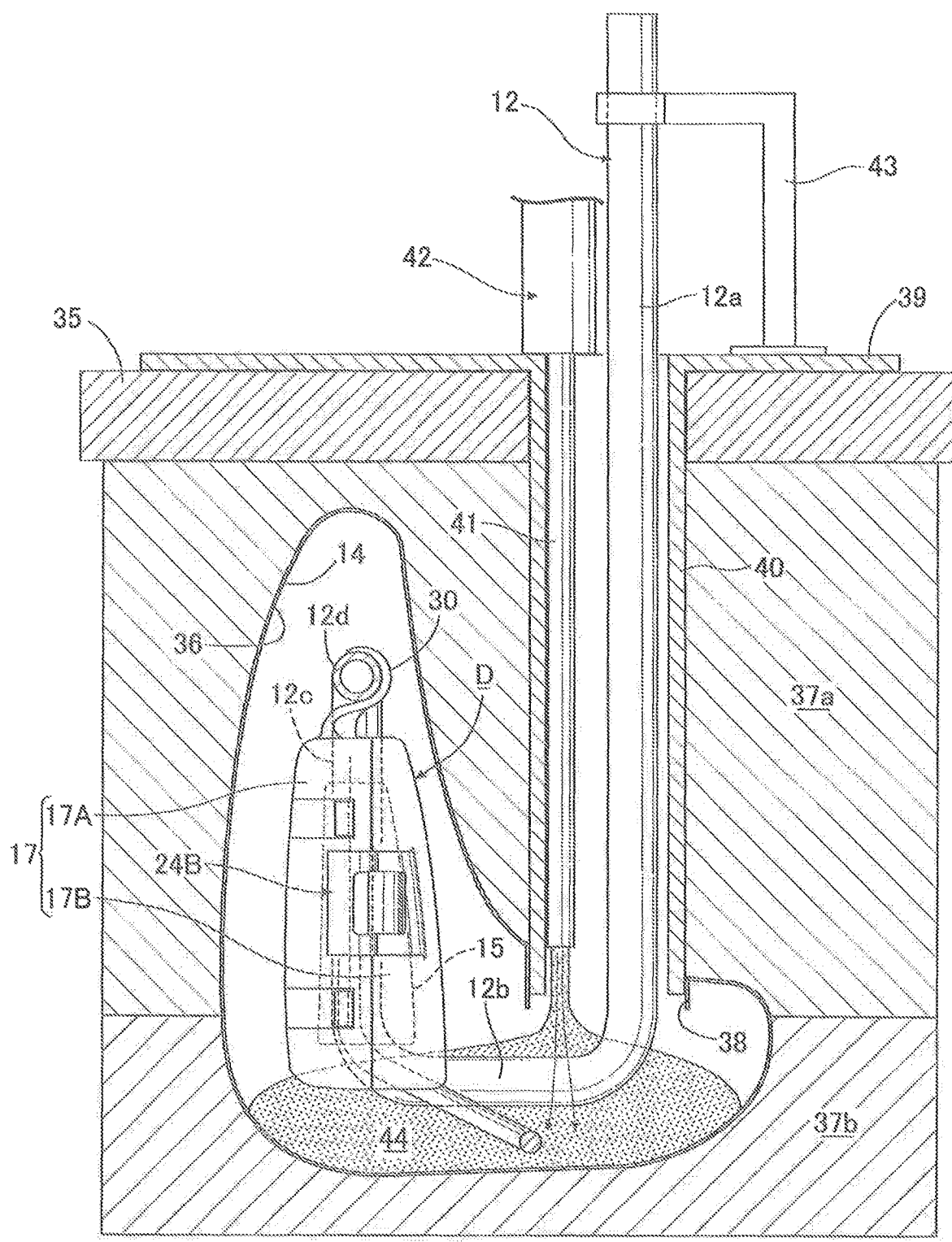
FIG. 8 is a diagram for explaining a method for molding a cushion member of a headrest using a foam material. (first embodiment)

A method for embedding the dynamic damper D in the headrest 4 is now explained by reference to FIG. 8.

Molds 37a and 37b that can be opened and closed in the vertical direction are mounted on a lower face of a machine platform 35, the molds 37a and 37b forming a cavity 36 corresponding to the external shape of the headrest 4 apart from the headrest frame 12, and the surface skin 14 for the headrest 4 is stretched in advance on an inner face of the cavity 36.

The surface skin 14 is provided with a foaming synthetic resin pouring inlet 38 opening on an upper face thereof, and a support plate 39 fixed to an upper face of a molding stage 35 is provided with a nozzle guide tube 40 inserted into the foam material pouring inlet 38. Mounted on the support plate 39 is a foam material supply device 42 having a nozzle 41 inserted into the nozzle guide tube 40. The main frame members 12a and 12a of the headrest frame 12 disposed within the nozzle guide tube 40 are supported on a bracket 43 provided on the support plate 39. The dynamic damper D, which is supported on the front vertical frame members 12c and 12c of the headrest frame 12, is disposed offset toward one side of the foam material pouring inlet within the surface skin 14.

The foam material 44 such as a urethane is poured into the bag-shaped surface skin 14 in intimate contact with the inner face of the cavity 36 from the foam material supply device 40 through the nozzle 41, etc., and by making it foam the cushion member 13 wrapped around the headrest frame 12 and the dynamic damper D can be formed within the surface skin 14. In this process, disposing the dynamic damper D, which is supported on the front vertical frame members 12c and 12c, offset toward one side of the foam material pouring inlet 38 enables the pouring pressure of the foam material 44 into the foam material pouring inlet 38 to be prevented from acting directly on the dynamic damper D, and there is therefore no possibility that the dynamic damper D will be disengaged from the front vertical frame members 12c and 12c of the elastic support parts 24A and 24B by means of the pouring pressure. Furthermore, since the first and second case halves 17A and 17B are joined by fitting together the mating groove 20 and the mating projecting wall 21 on their mating faces, it is possible to reliably prevent by virtue of a labyrinth effect the foam material 44 from entering via the joined faces of the two case halves 17A and 17B, thereby enabling the damping function of the dynamic damper D to be appropriately maintained.

The headrest 4 thus produced can be taken out of the molds 37a and 37b by opening them in the vertical direction.

The operation of this first embodiment is now explained.

When assembling the dynamic damper D, the weight 15 wrapped with the elastic sheet 16 as described above is fitted into the first case half 17A or the second case half 17B of the damper case 17, then opening parts of the two case halves 17A and 17B are matched up, and the mating projecting wall 21 of one opening part is inserted deeply into the mating groove 20 of the other opening part, thereby enabling the two case halves 17A and 17B to be simply joined by means of engagement of the elastic linking claws 22 and the latching holes 23 without using screws, etc., and at the same time the weight 15 can be supported in all directions on the damper case 17 via the elastic sheet 16.

Furthermore, after the first and second case halves 17A and 17B are joined, the elastic linking claws 22 can be subjected to elastic deformation to thus make them disengage from the linking holes 23, and the two case halves 17A and 17B can be separated to thus open the damper chamber 17C. It is therefore possible to easily carry out adjustment and alteration of the damping characteristics of the dynamic damper D by taking out the weight 15 and the elastic sheet 16 from the damper chamber C and replacing them with ones having different characteristics.

When mounting the dynamic damper D thus assembled onto the headrest frame 12, the gripping claws 26a and 26b of the first and second elastic support parts 24A and 24B are first pushed from the front against the left and right front vertical frame members 12c and 12c of the headrest frame 12, and the left and right gripping claws 26a and 26b are snap fitted onto the left and right front vertical frame members 12c and 12c to thus grip the front vertical frame members 12c and 12c. The damper case 17 can simply and easily be mounted on the headrest frame 12 without using a special mounting implement such as screws or a band and, moreover, because of the snap fitting of the gripping claws 26a and 26b there is no need to subject the left and right front vertical frame members 12c and 12c to special machining In this arrangement, since the internal diameter D2 of the gripping claw 26b of the second elastic support part 24B is set larger than the internal diameter D1 of the gripping claw 26a of the first elastic support part 24A, and the gripping claws 26a and 26b have different stiffnesses from each other, it is possible to absorb the manufacturing error resulting in a difference between the distance between the centers of the left and right front vertical frame members 12c and 12c and the distance between the centers of the left and right of the gripping claws 26a and 26b by relatively small elastic deformation of the left and right gripping claws 26a and 26b, and it is therefore possible to easily and reliably mount the two gripping claws 26a and 26b on the two front vertical frame members 12c and 12c in spite of the manufacturing error.

While the automobile is traveling, when there is transmission from the floor F of the automobile to the seat back 3 and the headrest 4 via the seat cushion 2 and the pivot shaft 9, in the dynamic damper D resonance of the weight 22 is accompanied by elastic deformation of the elastic sheet 16 and the vibrational energy of the seat back 3 and the headrest 4 is instead absorbed, thus damping the seat back 3 and the headrest 4.

Moreover, the dynamic damper D is formed by housing the weight 15 wrapped with the elastic sheet 16 in the damper case 17, which is formed from the first and second case halves 17A and 17B joined together so that they can be separated from each other, the first and second elastic support parts 24A and 24B, which engage with the front vertical frame members 12c and 12c from the direction opposite to the position of the second case half 17B, that is, from the front, are formed on the second case half 17B, and the positioning support part 30, which abuts against the front horizontal frame member 12d from the direction opposite to the position of the first case half 17A, that is, from the rear, is formed on the first case half 17A; when the weight 15 vibrates vigorously in the fore-and-aft direction and a rearward vibrational impact force acts on the second case half 17B, the vibrational impact force is supported by the left and right front vertical frame members 12c and 12c via the first and second elastic support parts 24A and 24B extending from the second case half 17B. When a forward vibrational impact force acts on the first case half 17A, the vibrational impact force is supported by the front horizontal frame member 12d via the positioning support part 30 extending from the first case half 17A. Therefore, neither forward nor rearward vibrational impact forces act on the first and second case halves 17A and 17B in the direction that separates them, and it is thus possible to prevent the damper case 17 from coming apart due to the vibrational impact force of the weight 15. Furthermore, since transmission of vibration of the weight 15 to the cushion member 13 is suppressed by the damper case 17, a disagreeable sensation is not given to an occupant.

Furthermore, since the first and second elastic support parts 24A and 24B are disposed so as to sandwich the center of gravity G of the weight 15, the vibrational impact force of the weight 15 can be supported stably via the second case half 17B. Moreover, since the plurality of pairs of elastic linking claws 22 and linking holes 23 formed on the first and second case halves 17A and 17B are disposed at positions sandwiching the weight 15, it is possible to support effectively the vibrational impact force of the weight 15 on the plurality of pairs of elastic linking claws 22 and linking holes 23 in the mutually engaged state, thereby preventing effectively deformation of the first and second case halves 17A and 17B.

Moreover, since the weight 15 is positioned such that the center of gravity G is displaced upwardly by e1 from the center C of the weight 15, the center of gravity G of the weight 15 occupies a position as far as possible from the support point of the vibration system formed from the seat cushion 2 and the headrest 4, and it is therefore possible to contribute to the damping function of the dynamic damper D with the weight 22 having a relatively small mass.

Moreover, since the gap A between the side face of the weight 15 and the inside face of the damper chamber C opposing the side face with the elastic sheet 16 sandwiched therebetween increases in the direction going away from the support point 9 of the single vibration system formed from the seat back 3 and the headrest 4, the amplitude of vibration of the weight 15 increases as it goes away from the support point 9, thereby logically enhancing the damping effect.

Furthermore, since due to the center of gravity G of the weight 15 being displaced rearwardly from the center C of the weight 15 by e2, the vibration center of the weight 15 is displaced rearwardly from the front face of the headrest 4 by a portion corresponding to the above e2; when the weight 15 vibrates, it is possible to suppress as much as possible a disagreeable sensation caused by the vibration from being given to the head of a seated person.

Figure 9:
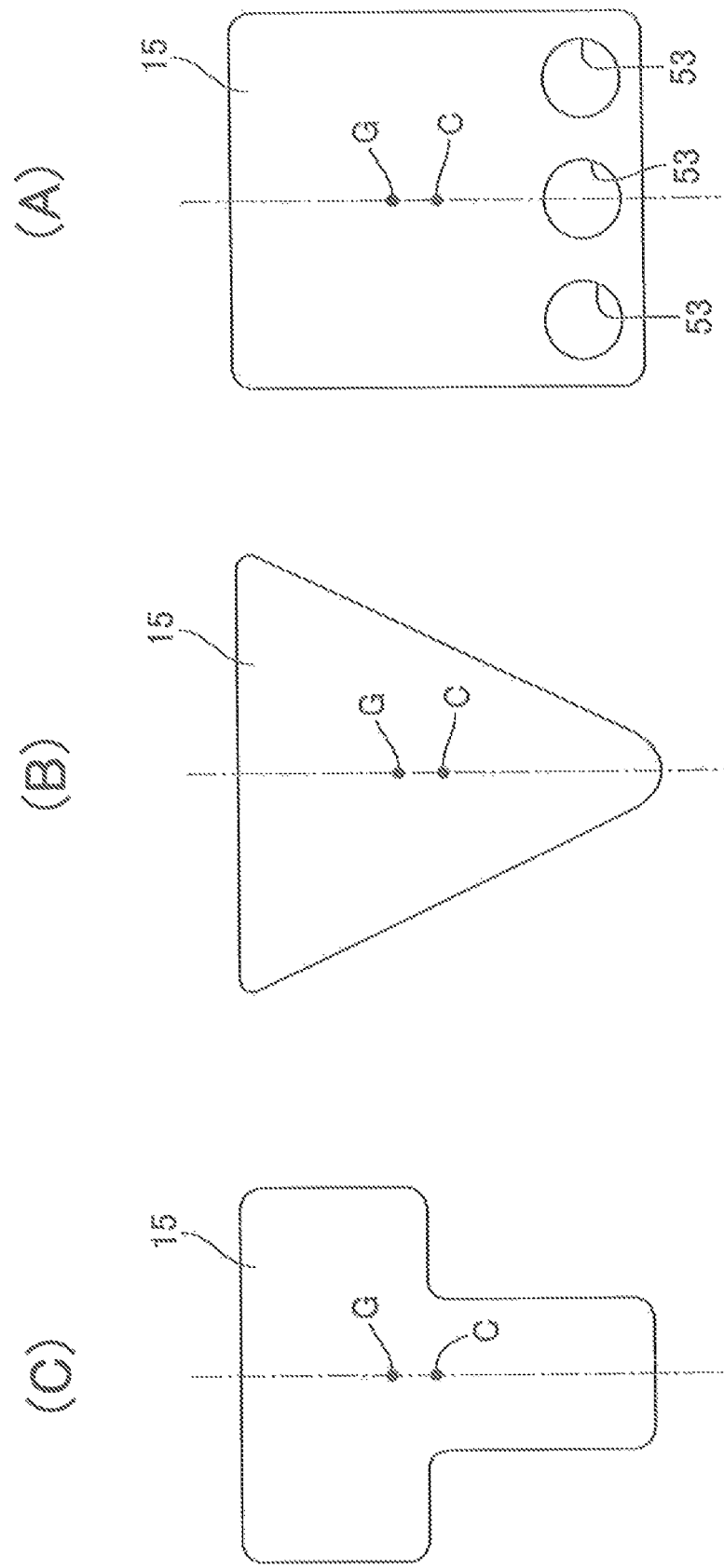
FIG. 9 is a front view showing differently shaped examples (A) to (C) of a weight in the dynamic damper. (first embodiment)

As the weight 15 in which the center of gravity G of the weight 15 is displaced upwardly from the center C of the weight 15, other than the weight 15 in the above embodiment, weights 15 shown in FIG. 9 (A) to (C) may be used. That is, the weight 15 of FIG. 9 (A) is provided in its lower part with a through hole 53, a recess part, or a cutout for reducing the mass to thus displace the center of gravity G upwardly from the center C of the weight 15, the weight 15 of FIG. 9 (B) is formed into an inverted triangle shape to thus displace the center of gravity G upwardly from the center C of the weight 15, and the weight 15 of FIG. 9 (C) is formed into a T-shape to thus displace the center of gravity G upwardly from the center C of the weight 15. A weight 15 having a shape combining the above may also be used.

Furthermore, since the damper case 17 has a box shape that is flat in the fore-and-aft direction so as to match the external shape of the weight 15, the front wall 17*f* is formed as a curved face that is close to a flat face so as to match the front face 15*f* of the weight 15, and the rear wall 17*r* is formed as a curved face that is curved to a greater extent than the front wall 17*f* with the protruding side facing toward the rear so as to match the rear face 15*r* of the weight 15, even when the head of an occupant is strongly pressed against the front wall 17*f* of the damper case 17 via the cushion member 13, the head of the occupant is supported over a relatively wide area of the front wall 17*f* of the damper case 17, thereby giving no disagreeable sensation to the occupant. Moreover, the curved shapes of the front wall 17*f* and the rear wall 17*r* contribute to reinforcing the stiffness of the damper case 17. The rear face of the weight 15 and the rear wall 17*r* of the damper case 17, which are strongly curved, can contribute to an improvement in the damping function of the dynamic damper D by utilizing effectively the space within the headrest 4 and allowing the thickness of the weight 15 to increase.

Figure 10:
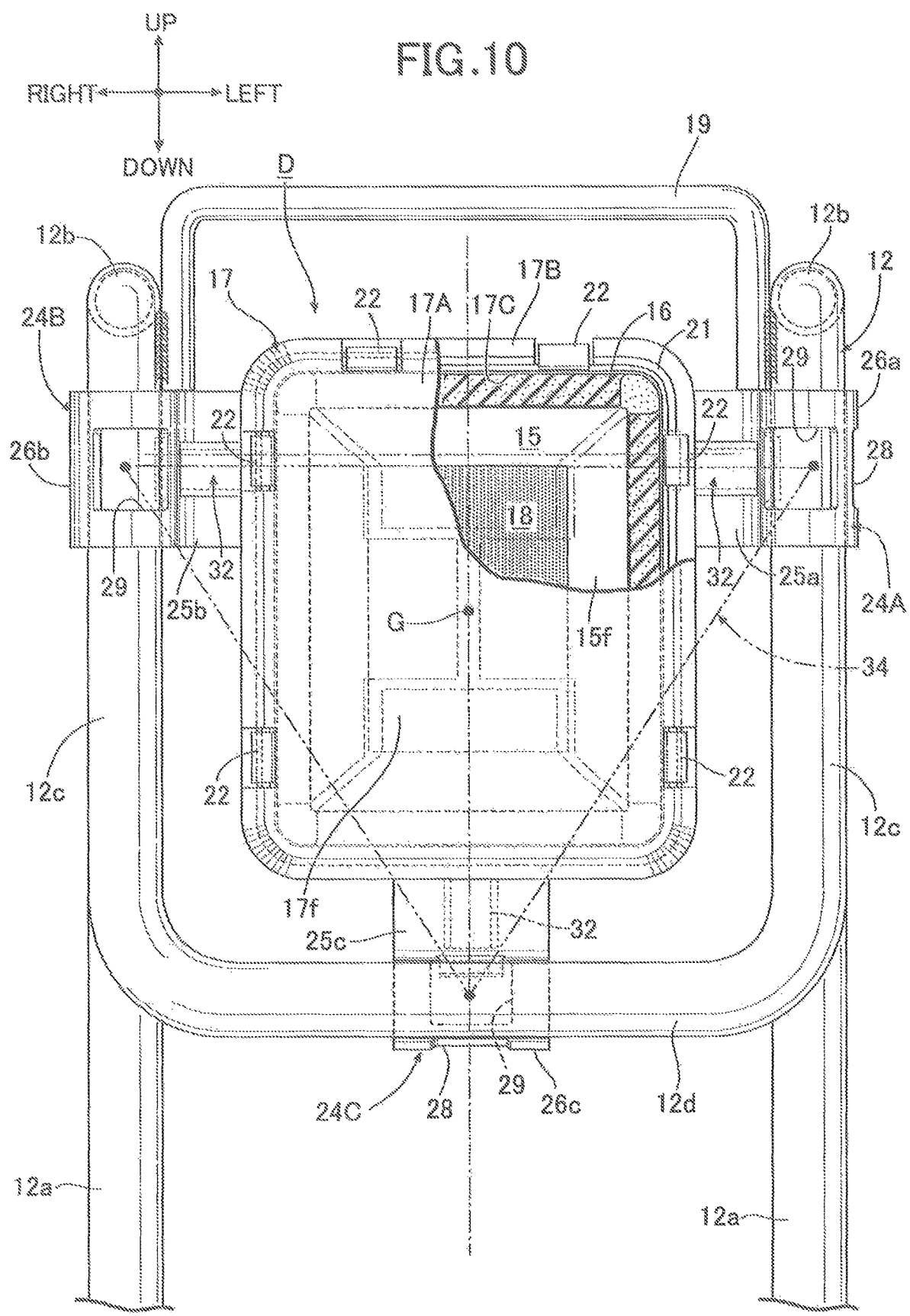
FIG. 10 is a front view, corresponding to FIG. 3, showing a second embodiment of the present invention. (second embodiment)

A second embodiment of the present invention shown in FIG. 10 is now explained.

Second Embodiment

In the second embodiment, three or more elastic support parts 24A to 24C supported on a headrest frame 12 are formed on a damper case 17 so as to be positioned at apexes of a polygon 34 surrounding the center of gravity G of a weight 15; specifically, the first to third elastic support parts 24A to 24C are formed on the damper case 17 so as to be disposed at the three apexes of an inverted triangle 34, and the weight 15 is formed so that the center of gravity G of the weight 15 is positioned in a region of the inverted triangle 34. The third elastic support part 24C is formed from an arm 25*c* and a major arc-shaped gripping claw 26*c* in basically the same manner as for the first and second elastic support parts 24A and 24B.

The first and second elastic support parts 24A and 24B are formed on a second case half 17B in the same manner as in the preceding embodiment and are snap fitted onto left and right front vertical frame members 12*c* and 12*c* of the headrest frame 12 from the front, and the third elastic support member 24C is formed on a first case half 17A and snap fitted onto the front horizontal frame member 12*d* from the rear.

Since the arrangement is otherwise the same as that of the preceding embodiment, parts in FIG. 10 corresponding to those of the preceding embodiment are denoted by the same reference numerals and symbols, and duplication of the explanation is omitted.

In accordance with the second embodiment, since the three or more elastic support parts 24A to 24C supported on the headrest frame 12 are formed on the damper case 17 so as to be positioned at the apexes of the polygon 34 surrounding the center of gravity G of the weight 15, the vibrational impact force of the weight 15 is dispersed substantially equally to all of the elastic support parts 24A to 24C via the damper case 17, thereby suppressing vibration of the damper case 17 effectively and contributing to an improvement in the ride comfort.

Figure 11:
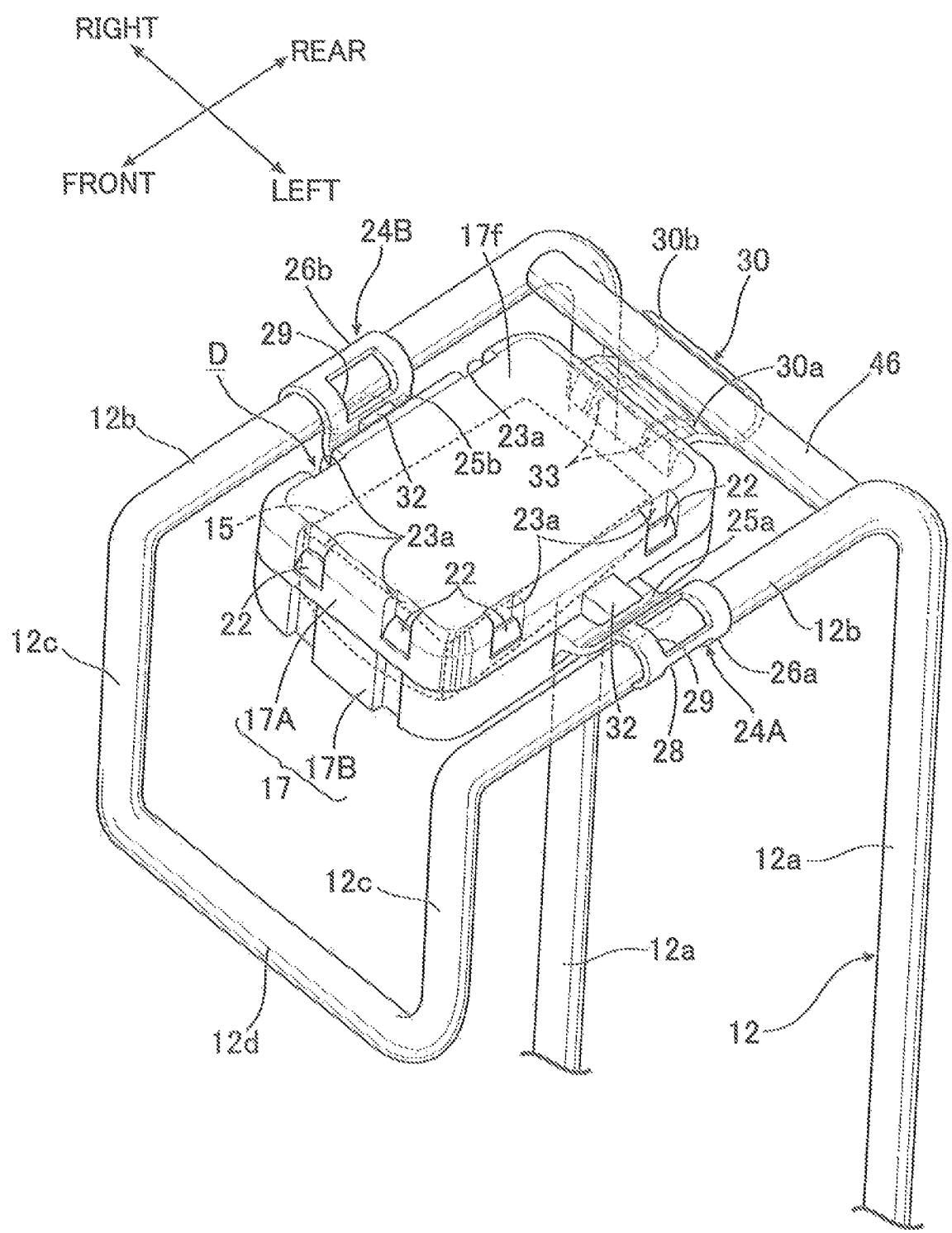
FIG. 11 is a perspective view of a headrest showing a third embodiment of the present invention. (third embodiment)

A third embodiment of the present invention shown in FIG. 11 is now explained.

Third Embodiment

In the third embodiment, the dynamic damper D of the first embodiment is mounted on left and right upper frame members 12*b* and 12*b* of a headrest frame 12. That is, first and second elastic support parts 24A and 24B of a damper case 17 are snap fitted onto the left and right upper frame members 12*b* and 12*b* from above, and a positioning support part 30 abuts against from below and engages with a cross member 46 linking rear end parts of the left and right upper frame members 12*b* and 12*b*. Since the arrangement is otherwise the same as that of the first embodiment, parts in FIG. 11 corresponding to those of the first embodiment are denoted by the same reference numerals and symbols, and duplication of the explanation is omitted.

In accordance with the third embodiment, it is possible, by utilizing effectively the space between the left and right upper frame members 12*b* and 12*b* for installing the dynamic damper D, to ensure that there is a sufficient thickness for a front part, against which the head of an occupant abuts, in a cushion member 13 of a headrest 4, and it is possible to enhance the damping function of the dynamic damper D by obtaining sufficient distance from the support point of a vibration system formed from a seat cushion 2 and the headrest 4 to the center of gravity G of a weight 22.

Figure 12:
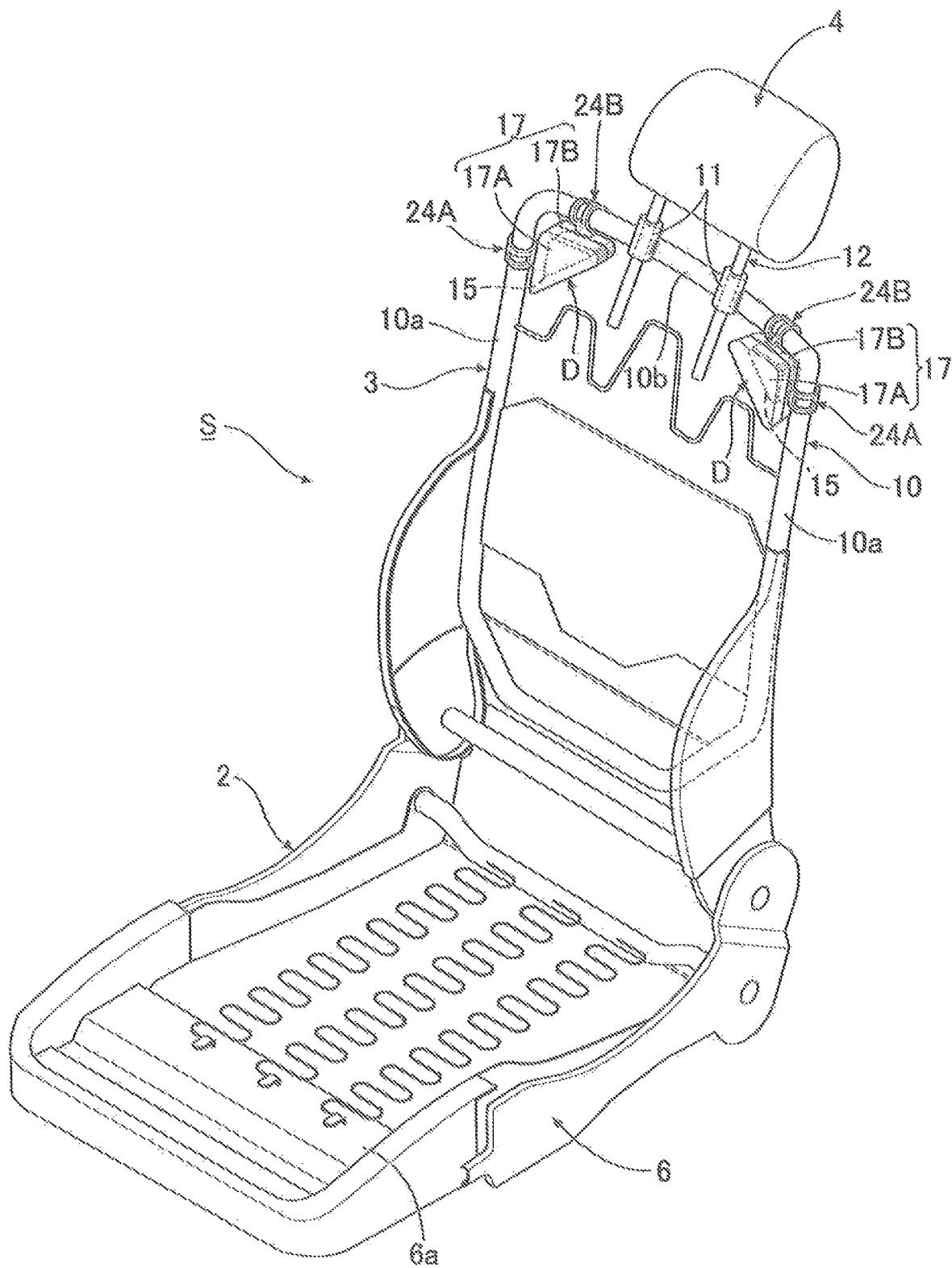
FIG. 12 is a perspective view of a seat device for an automobile showing a fourth embodiment of the present invention. (fourth embodiment)

A fourth embodiment of the present invention shown in FIG. 12 is now explained.

Fourth Embodiment

In the fourth embodiment, a dynamic damper D that includes a damper case 17 having a substantially right-angled triangle shape when viewed from the front is disposed on inner angles of upper left and right corners of a seat back frame 10 of a seat back 3, and a pair of elastic support parts 24A and 24B formed on an upper face and one side face of the damper case 17 are snap fitted onto a vertical frame member 10*a* and a lateral frame member 10*b* of the seat back frame 10. With regard to the structure of the dynamic damper D, only the shapes of the damper case 17 and the weight 15 housed therein are different from those of the first embodiment, and it is otherwise basically the same.

In accordance with the fourth embodiment, due to the action of the dynamic damper D disposed on the uppermost part of the seat back frame 10, damping of the seat back 3 can be carried out effectively. Moreover, dead spaces of the inner angles of the upper corners of the seat back frame 10 can be utilized effectively for installation of the dynamic damper D. The dynamic damper D may be disposed in an inner angle of only one of upper left and right corners of the seat back frame 10.

Figure 13:
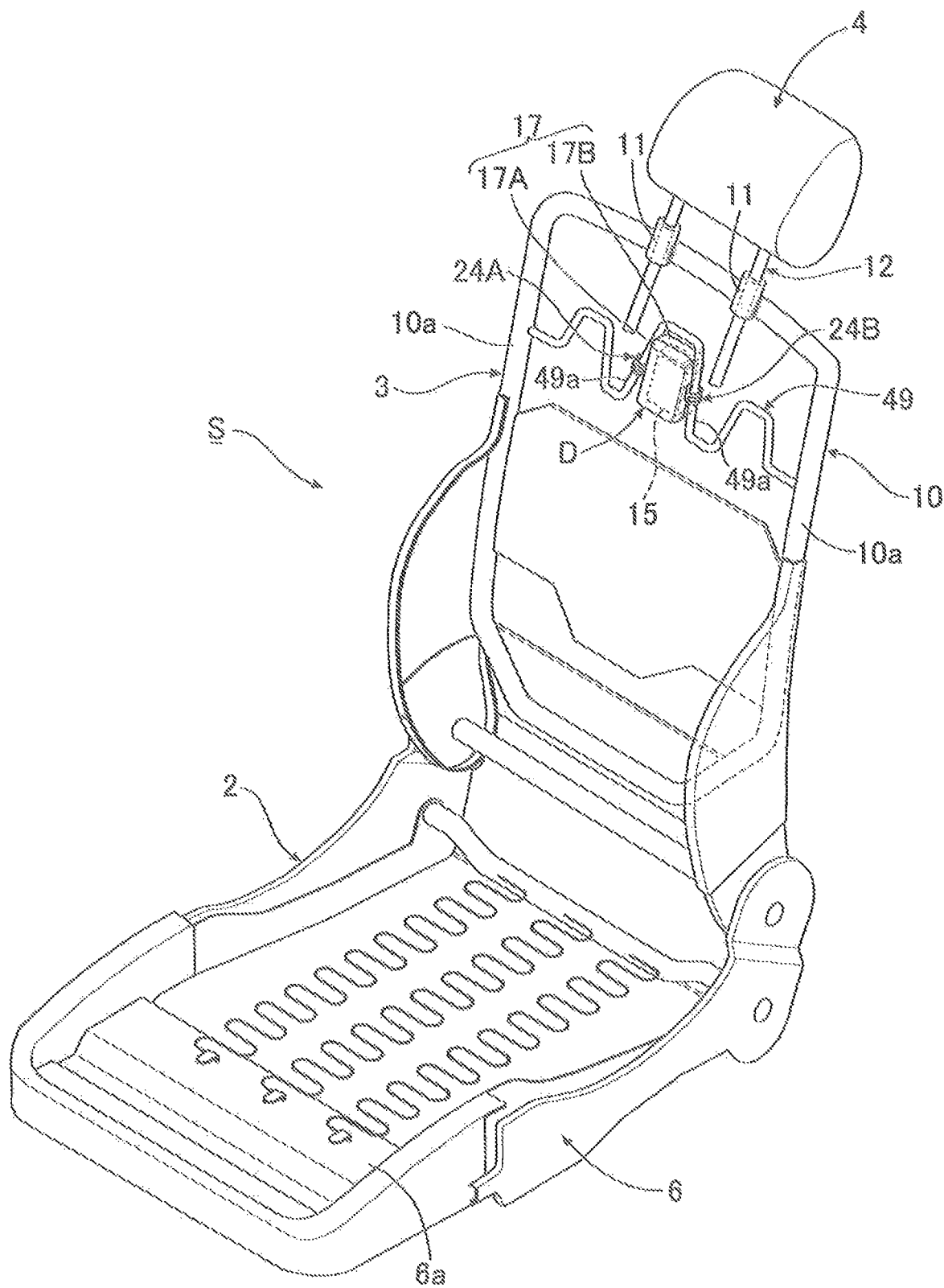
FIG. 13 is a perspective view of a seat device for an automobile showing a fifth embodiment of the present invention. (fifth embodiment)

A fifth embodiment of the present invention shown in FIG. 13 is now explained.

Fifth Embodiment

In the fifth embodiment, a pair of elastic support parts 24A and 24B formed on left and right side faces of a damper case 17 are snap fitted onto a pair of inclined frame portions 49a and 49a inclined in opposite directions from each other in a middle part of a wave-shaped frame member 49 integrally linking upper parts of left and right vertical frame members 10a and 10a of a seat back frame 10. In this arrangement, the pair of elastic support parts 24A and 24B are disposed in an inclined manner so as to match the pair of inclined frame portions 49a and 49a, and this prevents the pair of elastic support parts 24A and 24B from moving vertically along the pair of inclined frame portions 49a and 49a. The basic structure of the dynamic damper D is the same as that of the first embodiment. In this way, due to the operation of the single dynamic damper D mounted on the upper part and the central part of the seat back frame 10, damping of a seat back 3 can be carried out effectively.

Figure 14:
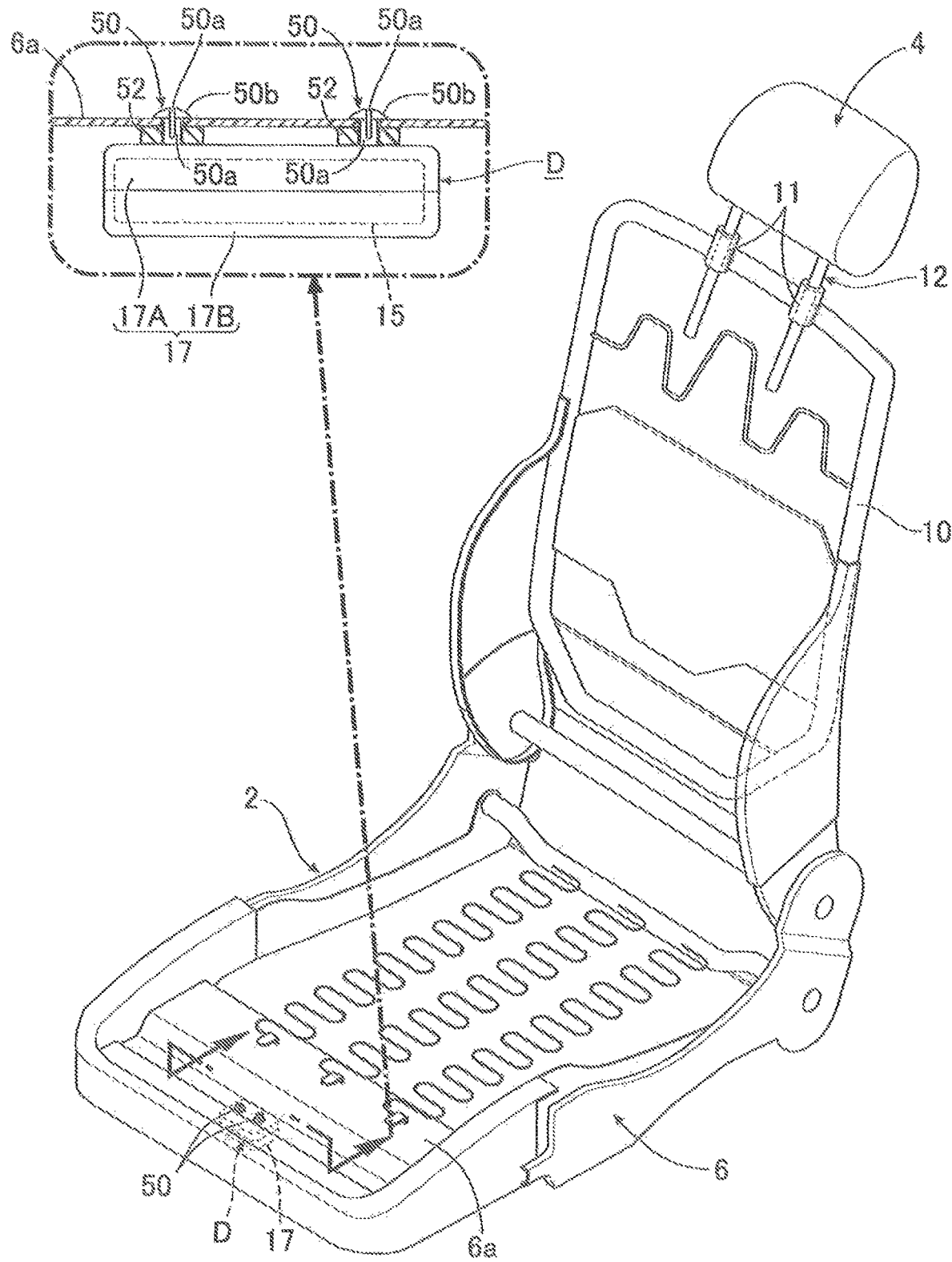
FIG. 14 is a perspective view of a seat device for an automobile showing a sixth embodiment of the present invention. (sixth embodiment)

A sixth embodiment of the present invention shown in FIG. 14 is now explained.

Sixth Embodiment

In the sixth embodiment, in order to damp a seat cushion 2, a damper case 17 of a dynamic damper D is mounted on a front reinforcing plate 6a welded to a front part of a seat cushion frame 6 and extending in the left-and-right direction. In this case, formed on an upper face of the damper case 17 are a pair of elastic support parts 50 and 50. Each elastic support part 50 is formed from a shaft portion 50a projecting from an outside face of the damper case 17 and an arrow-shaped latching projection 50b formed at the extremity of the shaft portion 50a, and in order to elastically reduce the diameter of the latching projection 50b, a slit 50c is provided from the extremity of the latching projection 50b to the shaft portion 50a. Furthermore, an elastic collar 52 made of rubber is fitted onto the shaft portion 50a. On the other hand, a pair of latching holes 51 and 51 are bored in the front reinforcing plate 6a so as to correspond to the pair of elastic support parts 50 and 50, the latching projection 50b of the elastic support parts 50 and 50 are pushed into the latching holes 51 and 51 from below, each latching projection 50b passes through the latching hole 51 while reducing in diameter elastically, and then increases in diameter to its original shape, that is, it is snap fitted, thereby preventing it from disengaging from the latching hole 51. In this arrangement, the elastic collar 52 fitted around the shaft portion 50a is compressed between the front reinforcing plate 6a and the damper case 17, and the reaction force thereof allows the latching projection 50b to be retained on the front face of the front reinforcing plate 6a without rattling. Other than the above elastic support parts 50 and 50, the structures of the damper case 17, a weight 15 housed therein, and an elastic sheet 16 wrapped around same are basically the same as those of the first embodiment. Therefore, parts in FIG. 13 corresponding to those of the first embodiment are denoted by the same reference numerals and symbols, and duplication of the explanation is omitted.

In accordance with the sixth embodiment, due to the operation of the dynamic damper D disposed on the front end part of the seat cushion frame 6, damping of the seat cushion 2 can be carried out effectively. Moreover, the dead space beneath the front reinforcing plate 6a at the front end of the seat cushion frame 6 can be utilized effectively for installation of the dynamic damper D and, furthermore, by a simple pushing-in operation the elastic support parts 50 and 50 can be snap fitted into the latching holes 51 and 51 of the front reinforcing plate 6a, thus enabling mounting of the damper case 17 to be easily carried out.

Figure 15:
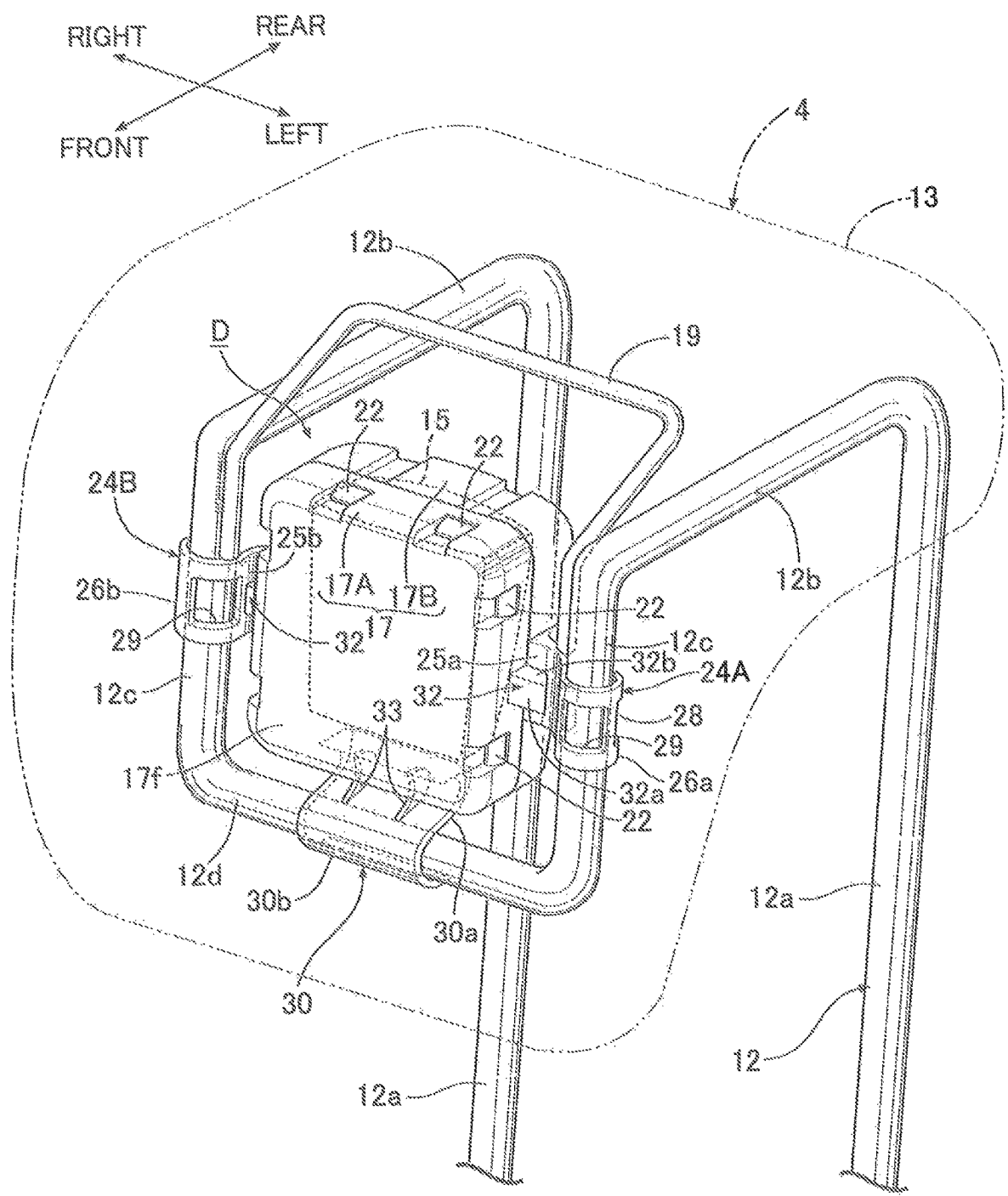
FIG. 15 is a view, corresponding to FIG. 6, showing a seventh embodiment of the present invention. (seventh embodiment)

A seventh embodiment of the present invention shown in FIG. 15 is now explained.

Seventh Embodiment

In the seventh embodiment, a positioning support part 30 is formed integrally with a second case half 17B together with first and second elastic support parts 24A and 24B. Moreover, a U-shaped abutment claw 30b of the positioning support part 30 engages with and abuts against a front horizontal frame member 12d from the front, and this defines engagement positions of gripping claws 26a and 26b of the first and second elastic support parts 24A and 24B with left and right front vertical frame members 12c and 12c. Since the arrangement is otherwise the same as that of the first embodiment, parts in FIG. 15 corresponding to those of the first embodiment are denoted by the same reference numerals and symbols, and duplication of the explanation is omitted.

In accordance with the seventh embodiment, when mounting the dynamic damper D on a headrest frame 12, the gripping claws 26a and 26b of the first and second elastic support parts 24A and 24B are first made to oppose the left and right front vertical frame members 12c and 12c of the headrest frame 12 and the positioning support part 30 is made to oppose the front horizontal frame member 12d, and the damper case 17 is pressed in from the front to the rear, thus carrying out snap fitting of the gripping claws 26a and 26b onto the front vertical frame members 12c and 12c and engagement and abutment of the positioning support part 30 against the front horizontal frame member 12d at the same time and thereby enabling the dynamic damper D to be simply positioned and mounted on the headrest frame 12.

Figure 16:
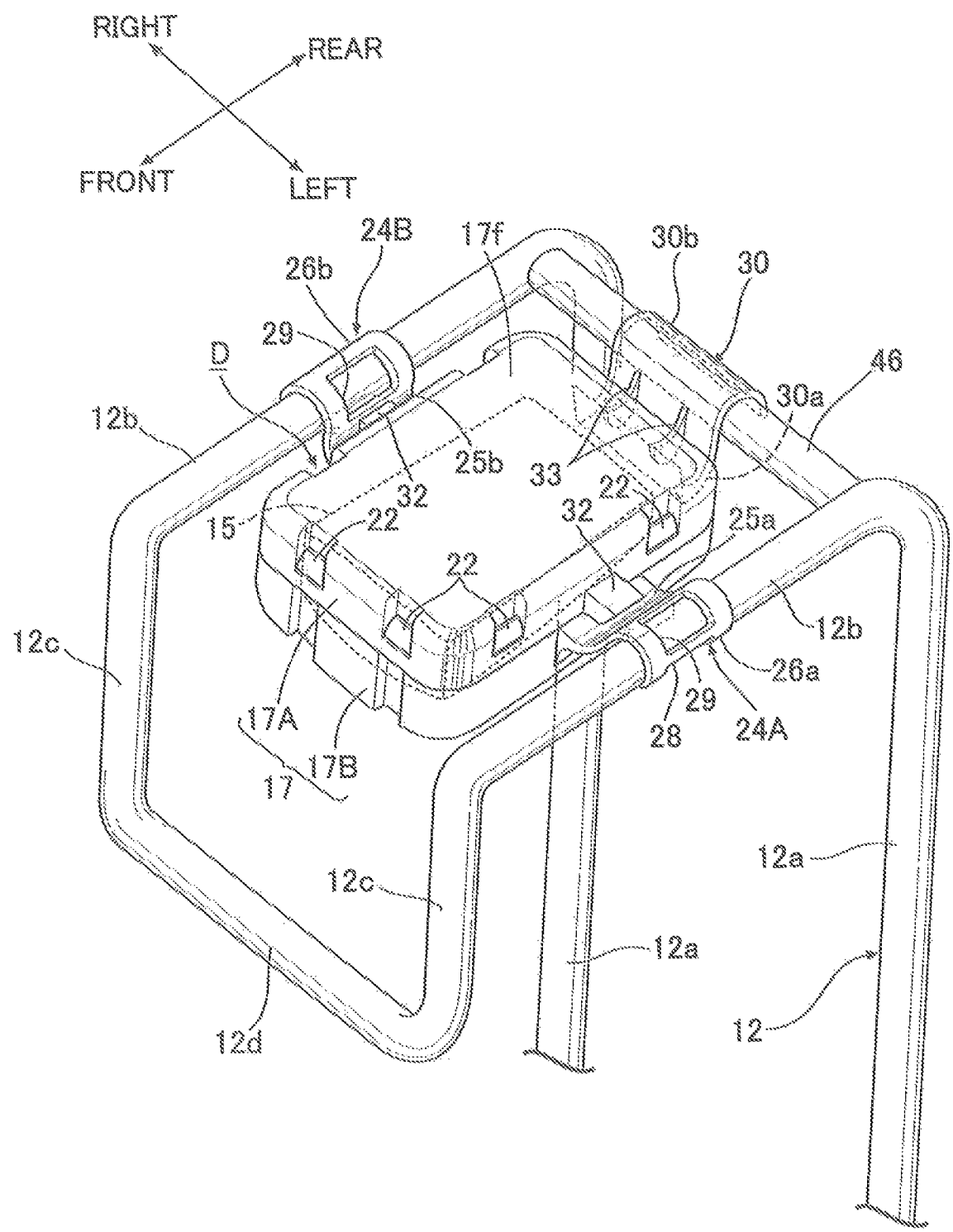
FIG. 16 is a view, corresponding to FIG. 11, showing an eighth embodiment of the present invention. (eighth embodiment)

An eighth embodiment of the present invention shown in FIG. 16 is now explained.

Eighth Embodiment

In the eighth embodiment, as in the third embodiment of FIG. 11, first and second elastic support parts 24A and 24B of a damper case 17 are snap fitted onto left and right upper frame members 12b and 12b from above, but this embodiment is different from the third embodiment of FIG. 11 in terms of a positioning support part 30 that engages with and abuts against a cross member 46 linking rear end parts of the left and right upper frame members 12b and 12b from above. Since the arrangement is otherwise the same as that of the third embodiment, parts in FIG. 16 corresponding to those of the third embodiment are denoted by the same reference numerals and symbols, and duplication of the explanation is omitted.

In accordance with the eighth embodiment it is possible, by pushing in the damper case 17 from above to below the headrest frame 12 in one stroke, to easily position and mount the damper case 17 on the headrest frame 12.

Figure 17:
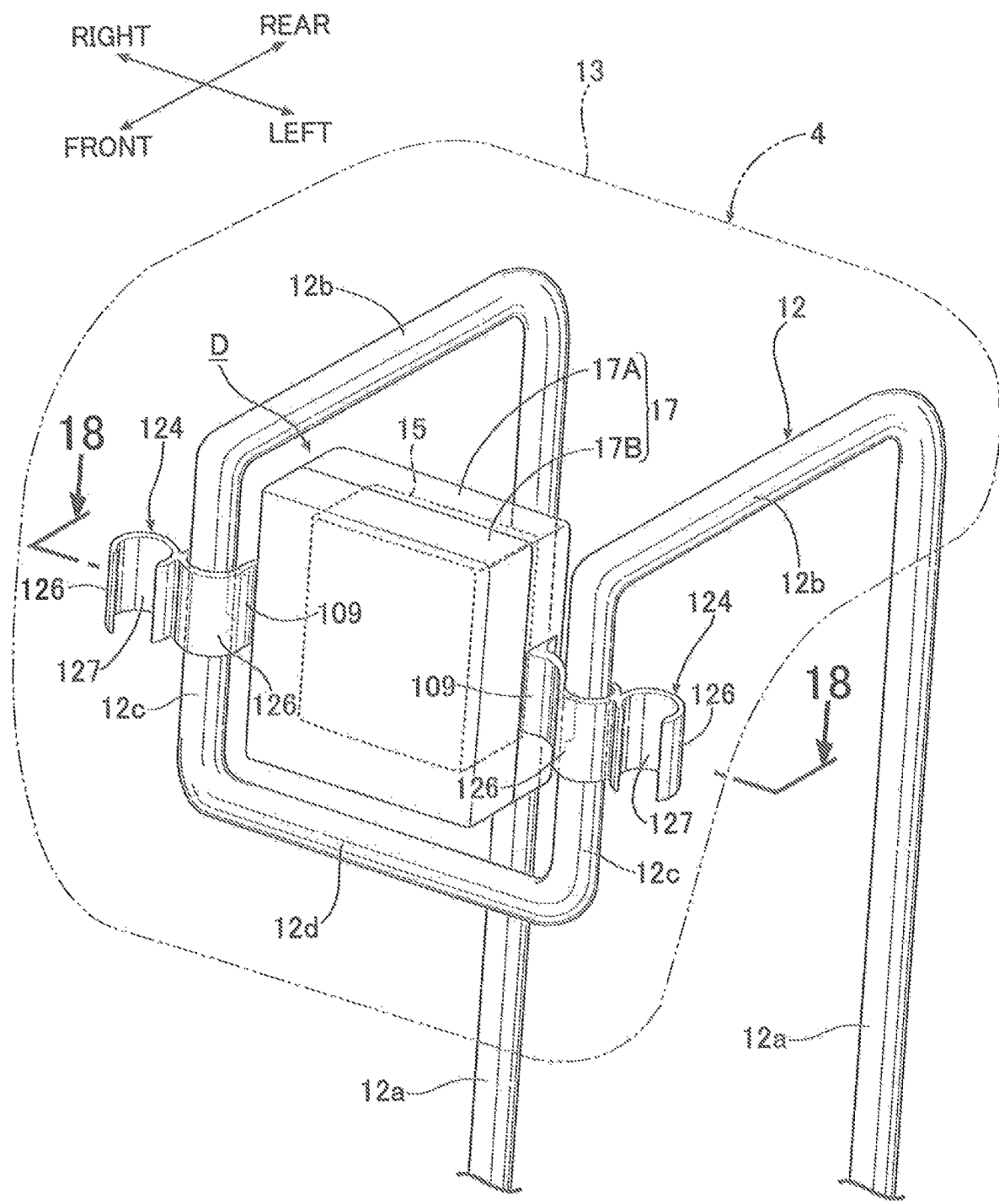
FIG. 17 is a perspective view of a headrest for a seat for an automobile related to a ninth embodiment of the present invention. (ninth embodiment)
Figure 18:
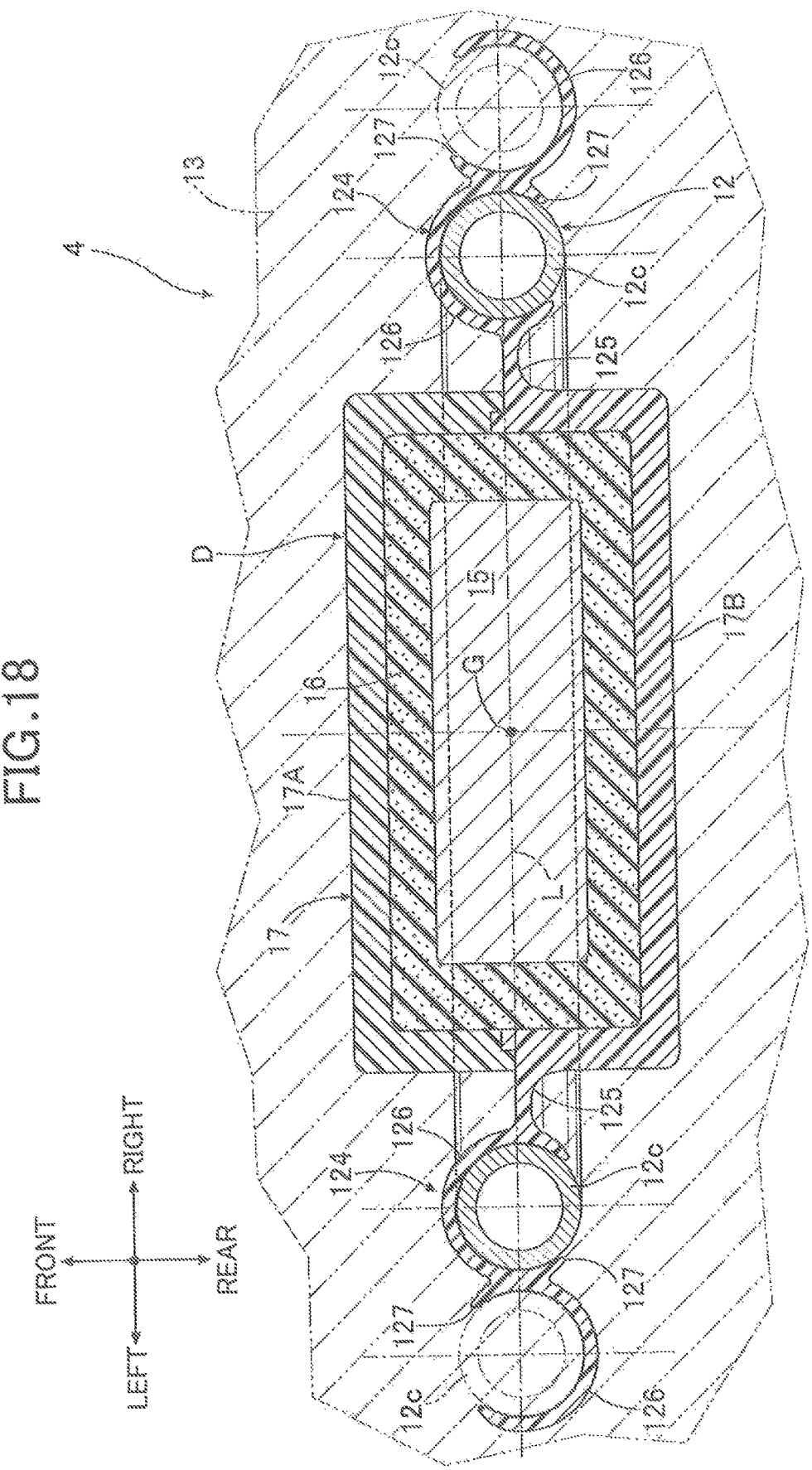
FIG. 18 is a sectional view along line 18-18 in FIG. 17. (ninth embodiment)

A ninth embodiment of the present invention shown in FIG. 17 and FIG. 18 is now explained.

Ninth Embodiment

In the ninth embodiment, a damper case 17 is linked to front vertical frame members 12c and 12c of a headrest frame 12 via a pair of variable type mounting parts 124 and 124 formed symmetrically on left and right sides of the damper case 17. Each variable type mounting part 124 is formed from a linking arm 109 and 109 linked by integral molding with left and right side faces of one of case halves 17a and 17b and extending outwardly to the left and to the right, and a plurality of elastic gripping parts 126 and 126 (outside linking parts) provided at different positions in the length direction of each linking arm 109; the plurality of elastic gripping parts 126 and 126 are each formed so as to curve in a major arc shape and are linked integrally so as to have opening parts 127 facing in opposite directions from each other.

Furthermore, the left and right variable type mounting parts 124 and 124 are disposed symmetrically with the center of gravity G of a weight 15 sandwiched therebetween, and are desirably disposed on a straight line L that passes through the center of gravity G and the front vertical frame members 12c and 12c.

When mounting a dynamic damper D on the front vertical frame members 12c and 12c of a headrest 4, the pair of left and right elastic gripping parts 126 and 126 that are separated by a distance corresponding to the distance between the left and right front vertical frame members 12c and 12c are selected from the left and right linking arms 109 and 109, these elastic gripping parts 126 and 126 are pressed against the left and right front vertical frame members 12c and 12c via respective opening parts 127, and the elastic gripping parts 126 and 126 are snap fitted onto the outer peripheral faces of the front vertical frame members 12c and 12c over greater than half of the periphery, thereby linking them. Therefore, for a headrest 4 for which the distance between the left and right front vertical frame members 12c and 12c is different from the above, a pair of left and right elastic gripping parts 126 and 126 that are different from the above are selected from the left and right linking arms 109 and 109 and snap fitted onto the front vertical frame members 12c and 12c, thus enabling a common dynamic damper D to be mounted on different headrests 4 and thereby enabling a dynamic damper D with good multi-purpose features to be provided at low cost.

After mounting the dynamic damper D, a cushion member 13 of the headrest 4 is foam molded into a tear-drop shape so as to be wrapped around the headrest frame 12 from the upper end parts of the main frame members 12a and 12a to the front horizontal frame member 12d, and the damper case 17 and the left and right variable type mounting parts 124 and 124 are embedded in the cushion member 13. In this process, the cushion member 13 is prevented from entering the interior by means of the damper case 17, and the spring constant of an elastic member 16 does not deviate.

Since the variable type mounting parts 124, which are linked to the left and right front vertical frame members 12c and 12c in the headrest 4, are disposed symmetrically with the dynamic damper D sandwiched therebetween, when the dynamic damper D is mounted on various types of headrest 4 it is always disposed in a middle section between the left and right front vertical frame members 12c and 12c, and it is possible to stabilize support of the dynamic damper D and enable the damping function of the dynamic damper D toward the headrest 4 and the seat back to be exhibited effectively.

Moreover, since the left and right variable type mounting parts 124 and 124 are disposed symmetrically with the center of gravity G of the weight 6 of the dynamic damper D sandwiched therebetween, the center of gravity G of the weight 6 of the dynamic damper D mounted on various types of headrest is disposed in a middle section between the pair of front vertical frame members 12c and 12c, and it is possible to stabilize support of the weight 6 of the dynamic damper D and enable the damping function of the dynamic damper D toward the headrest 4 and the seat back to be exhibited more effectively.

Furthermore, since the left and right variable type mounting parts 124 are disposed on the straight line L that passes through the center of gravity G of the weight 6 of the dynamic damper D and the left and right front vertical frame members 12c and 12c, it is possible to further stabilize support of the weight 6 of the dynamic damper D and enable the damping function of the dynamic damper D toward the headrest 4 and the seat back to be exhibited yet more effectively.

Figure 19:
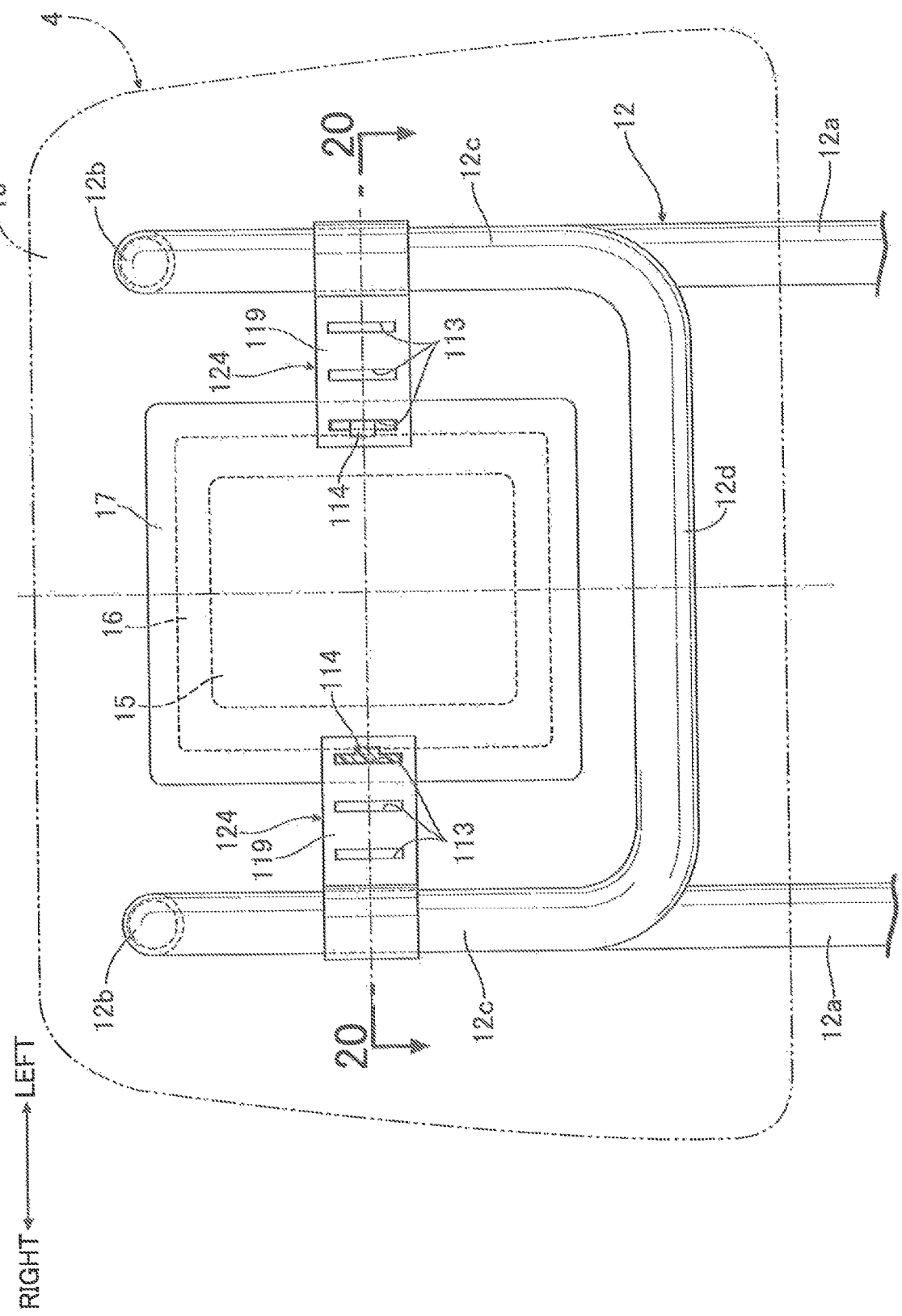
FIG. 19 is a front view of a headrest for a seat for an automobile related to a tenth embodiment of the present invention. (tenth embodiment)
Figure 20:
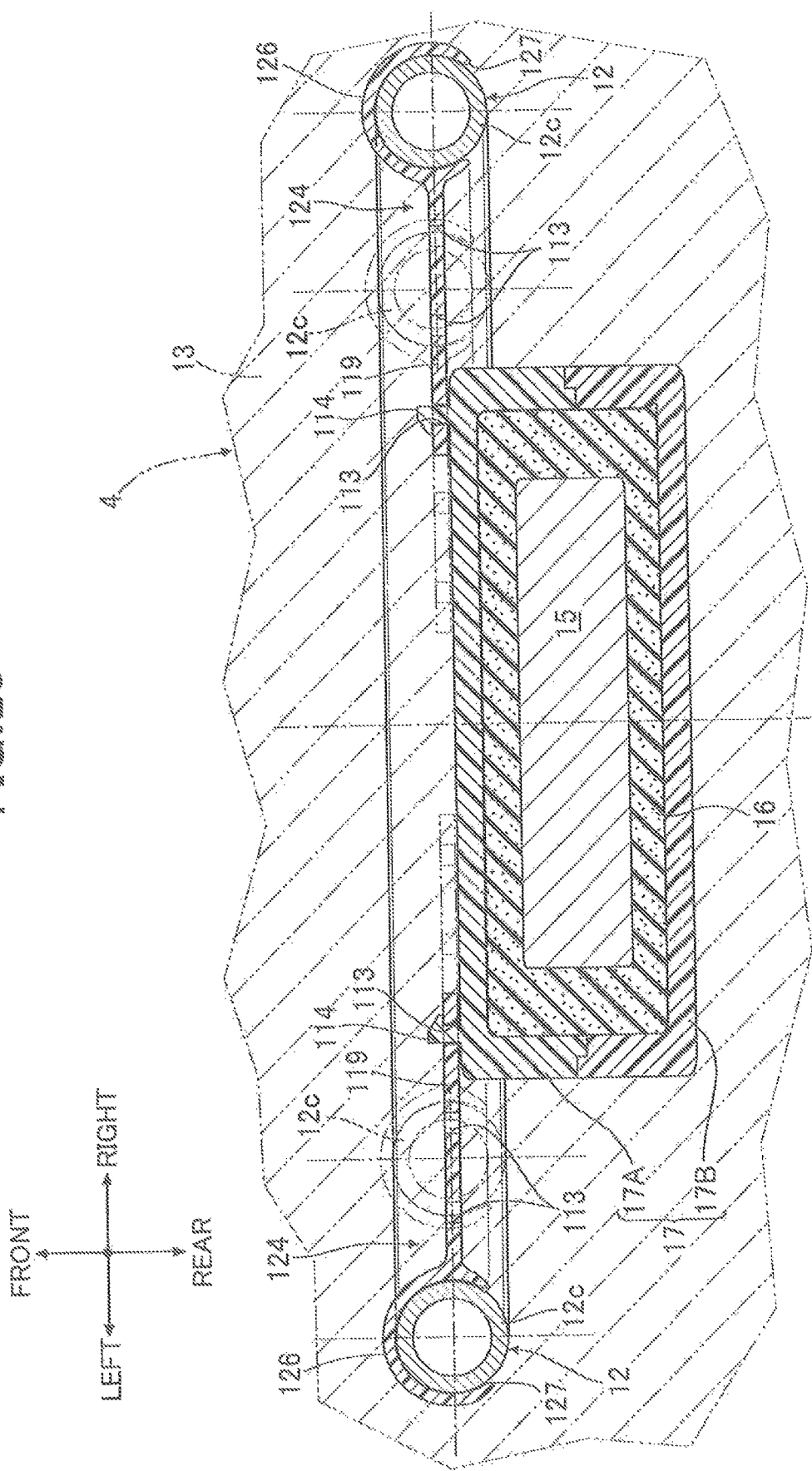
FIG. 20 is a sectional view along line 20-20 in FIG. 19. (tenth embodiment)

A tenth embodiment of the present invention shown in FIG. 19 and FIG. 20 is now explained.

Tenth Embodiment

In the tenth embodiment, left and right variable type mounting parts 124 and 124 are each formed from a synthetic resin linking arm 119, an elastic gripping part 126 molded integrally with one end of the linking arm 119, and a plurality of linking holes 113 provided at different positions on the other end side of the linking arm 119. The elastic gripping part 126 is curved into a major arc shape and can be snap fitted onto and grip an outer peripheral face of a front vertical frame member 12c of a headrest 4 over greater than half of the periphery via an opening part 127. On the other hand, a pair of left and right elastic latching claws 114 and 114 are projectingly provided on a front face or a rear face of a damper case 17, and the elastic latching claws 114 and 114 can be selectively snap fitted onto and linked to the plurality of linking holes 113; 113 of the left and right linking arms 119 and 119.

Since the arrangement is otherwise the same as that of the ninth embodiment, parts in FIG. 19 and FIG. 20 corresponding to those of the ninth embodiment are denoted by the same reference numerals and symbols, and duplication of the explanation is omitted.

When mounting a dynamic damper D on the front vertical frame members 12c and 12c of the headrest 4, the elastic gripping parts 126 and 126 of the linking arms 119 and 119 are first snap fitted onto the left and right front vertical frame members 12c and 12c of the headrest 4, the damper case 17 is then disposed in a middle section between the left and right front vertical frame members 12c and 12c, and the left and right elastic latching claws 114 and 114 are snap fitted onto and linked to the linking holes 113 and 113 that are the closest thereto. Therefore, for a headrest 4 for which the distance between the left and right front vertical frame members 12c and 12c is different from the above, other linking holes 113 and 113 than the above are selected from the left and right linking arms 119 and 119, and the elastic latching claws 114 and 114 are snap fitted thereinto, thus enabling a common dynamic damper D to be mounted on different headrests 4 and thereby enabling a dynamic damper D with good multi-purpose features to be provided at low cost.

Figure 21:
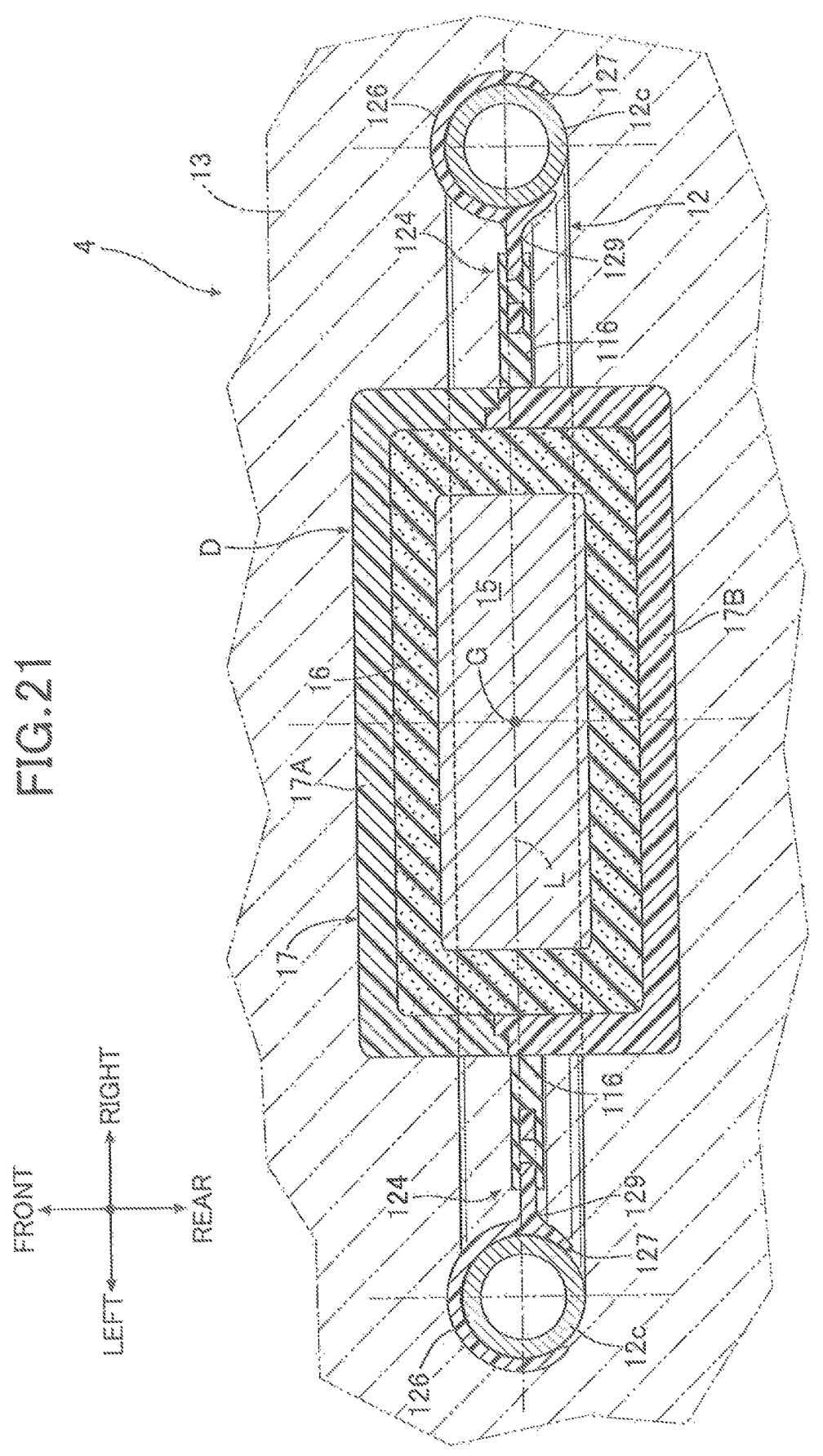

An eleventh embodiment of the present invention shown in FIG. 21 is now explained.

Eleventh Embodiment

In the eleventh embodiment, left and right variable mounting parts 124 and 124 are each formed from a synthetic resin linking arm 129, a spring member 116 made of rubber, etc., joining one end of the linking arm 129 to an outside face of a damper case 17, and an elastic gripping part 126 molded integrally with the other end of the linking arm 129, the elastic gripping part 126 being curved into a major arc shape and being capable of being snap fitted onto and gripping an outer peripheral face of a front vertical frame member 12c of a headrest 4 over greater than half of the periphery via an opening part 127. Since the arrangement is otherwise the same as that of the first embodiment, parts in FIG. 21 corresponding to those of the ninth embodiment are denoted by the same reference numerals and symbols, and duplication of the explanation is omitted.

In accordance with the eleventh embodiment, it is possible, by expanding and contracting the left and right spring members 116 and 116 according to a change in the distance between the left and right front vertical frame members 12c and 12c, to snap fit the elastic gripping parts 126 and 126 onto the front vertical frame members 12c and 12c of a plurality of types of headrest 4, thereby enabling a dynamic damper device with good multi-purpose features to be provided at low cost.

Finally, a twelfth embodiment of the present invention is explained by reference to FIG. 22 to FIG. 24.

Twelfth Embodiment

In the twelfth embodiment, a dynamic damper D is mounted on a seat back 3 of a seat. The seat back 3 is formed from a seat back frame 10 and a cushion member 31 supported on a front face thereof. The seat back frame 10 is formed from a pair of left and right support post portions 10a and 10a and a linking portion 10b integrally linking upper end parts thereof, the linking portion 10b having a pair of left and right inclined portions 10b1 and 10b1 disposed in a downward divergent shape.

Left and right variable type mounting parts 124 and 124 are each formed from a synthetic resin linking arm 139, an elastic gripping part 126 molded integrally with one end of the linking arm 139, and a plurality of circular linking holes 123 and 123 provided at different positions on the other end side of the linking arm 139. The elastic gripping part 126 is curved into a major arc shape and is snap fitted onto and grips an outer peripheral face of the support post portion 10a or the inclined portion 10b1 of the linking portion 10b of the seat back frame 10 over greater than half of the periphery via an opening part 127. On the other hand, a pair of left and right circular cross section elastic latching claws 125 and 125 are projectingly provided on a front face or a rear face of the damper case 17, these elastic latching claws 125 and 125 being capable of being selectively snap fitted into, linked to, and pivoted relative to the plurality of linking holes 123; 123 of the left and right linking arms 139 and 139.

Figure 22:
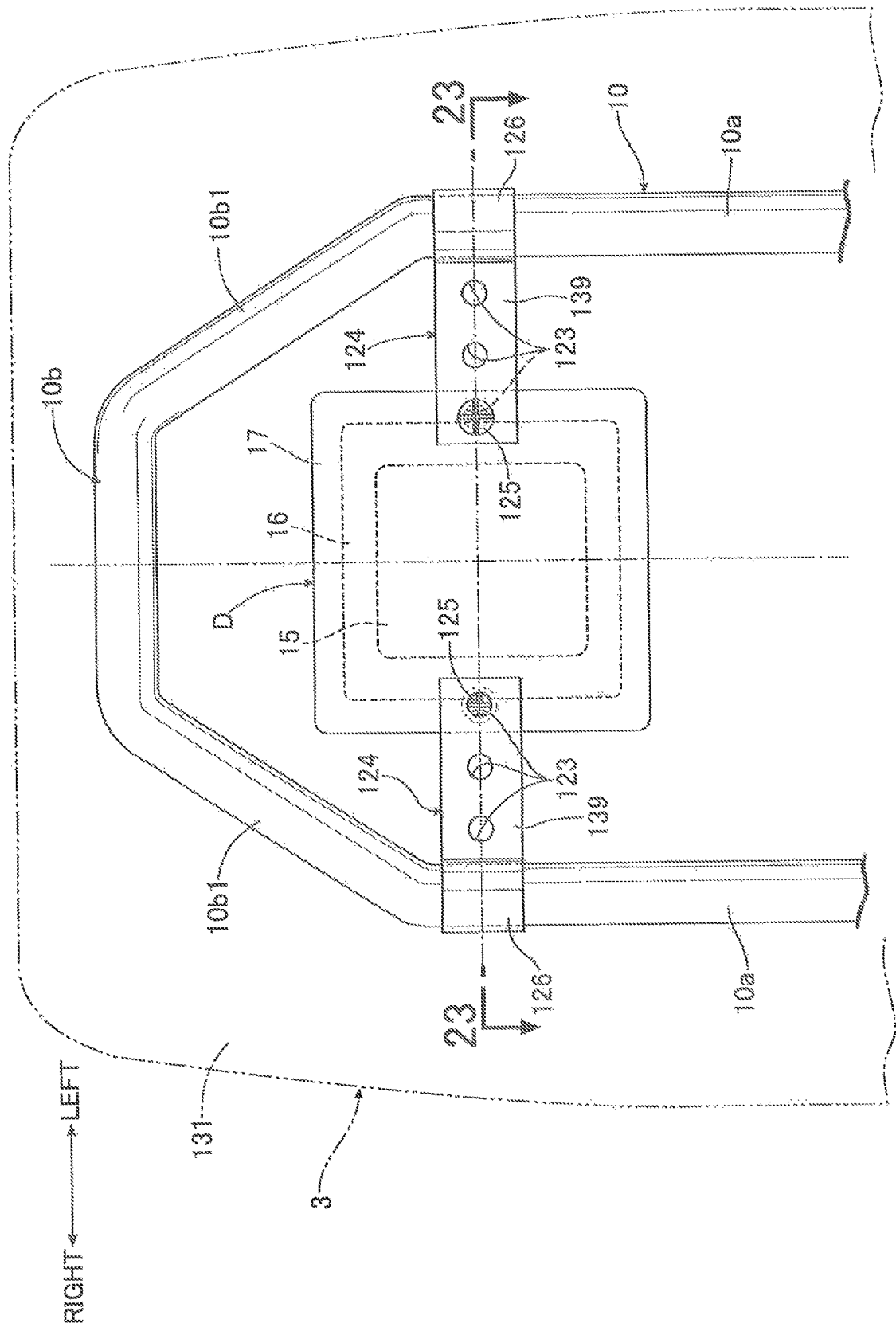
FIG. 22 is a front view of a seat back of a seat for an automobile related to a twelfth embodiment of the present invention. (twelfth embodiment)
Figure 23:
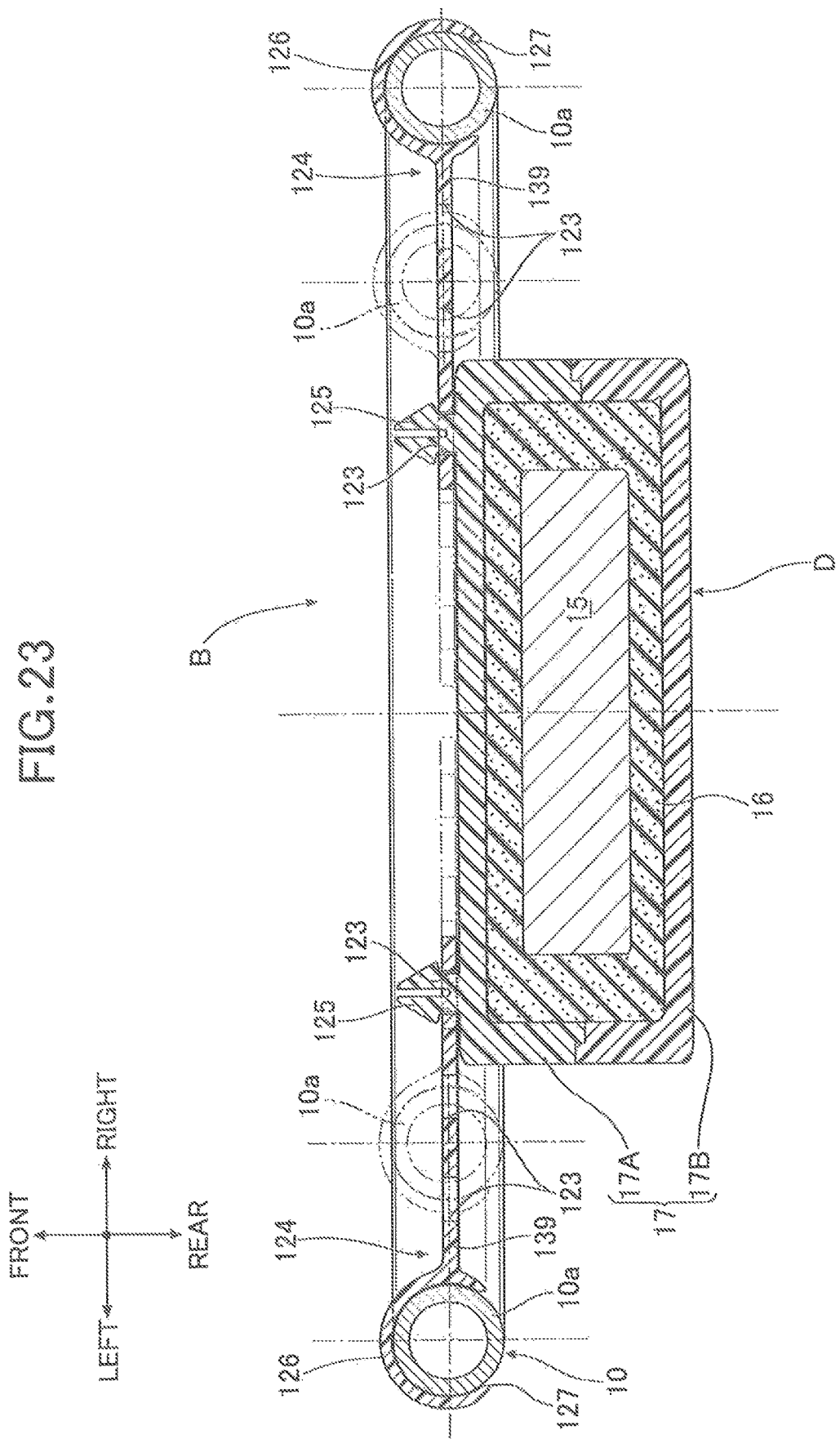
FIG. 23 is a sectional view along line 23-23 in FIG. 22. (twelfth embodiment)

Since the arrangement of the dynamic damper D is the same as that of the first embodiment, parts in FIG. 22 to FIG. 24 corresponding to those of the ninth embodiment are denoted by the same reference numerals and symbols, and duplication of the explanation is omitted.

In accordance with this embodiment, as shown in FIG. 22, when mounting the dynamic damper D on the left and right support post portions 10a and 10a via the linking arms 139 and 139, as in the tenth embodiment, according to the distance between the two support post portions 10a and 10a, the elastic latching claws 125 and 125 are selectively engaged with the plurality of linking holes 123; 123 of the linking arms 139 and 139, thus enabling the dynamic damper D to be mounted on a plurality of types of seat back 3 having different distances between the two support post portions 10a and 10a. Moreover, since each linking arm 139 can pivot around the elastic latching claw 125, as shown in FIG. 24, the left and right linking arms 139 and 139 axially supported on the damper case 17 are inclined appropriately, thus enabling the elastic gripping parts 126 and 126 to be engaged with the left and right inclined portions 10b1 and 10b1. In this way, it becomes possible to mount the dynamic damper D on the inclined portions 10b1 and 10b1, thus further improving the multi-purpose features of the dynamic damper D.

The present invention is not limited to the above embodiments and may be modified in a variety of ways as long as the modifications do not depart from the spirit and scope thereof. For example, the first to third embodiments can be applied in combination with the fourth and the fifth embodiment. Furthermore, one of the first and second halves 17A and 17B forming the damper case 17 may be formed into a box shape having an opening and the other may be formed into a lid shape closing the opening. Moreover, the seat device of the present invention may be applied not only to an automobile but also to a railway vehicle, an airplane, etc. Furthermore, the seat S may be installed so as to protrude from a wall face of a vehicle.

The invention claimed is:

1. A seat device for a vehicle, comprising a seat having a cushion member, a frame and a dynamic damper attached to the frame of the seat, wherein the dynamic damper comprises:
   a damper case that is housed in the cushion member;
   a weight that is housed in the damper case, and
   an elastic member which is separate from the cushion member and disposed in the damper case between a wall of the damper case and the weight.

2. The seat device for a vehicle according to claim 1, wherein
   left and right mounting parts are provided on the damper case and are attached to the frame,
   as seen in a front view of the seat, portions of the mounting parts are engaged with the frame at positions on left and right sides of the damper case, and
   a further mounting part different from the left and right mounting parts is also provided on the damper case at a position between the left and right mounting parts, and is engaged with the frame.

3. The seat device for a vehicle according to claim 2, wherein portions of the frame with which the left and right mounting parts are engaged extend in an up-down direction of the seat, and a portion of the frame with which the further mounting part is engaged extends in a left-right direction of the seat.

4. The seat device for a vehicle according to claim 2,
wherein the frame is a headrest frame and has a pair of left and right main frame members extending in an up-down direction of the seat,
the left and right mounting parts are engaged with the main frame members, respectively, and
as seen in a side view of the seat, the weight and the main frame members are disposed at positions overlapping with each other in the up-down direction of the seat.

5. The seat device for a vehicle according to claim 4, wherein as seen in the side view of the seat, the left and right mounting parts are disposed at positions overlapping with the weight and the main frame members in the up-down direction of the seat.

6. The seat device for a vehicle according to claim 2, wherein
the frame is a headrest frame and has a frame member extending in a left-right direction of the seat,
the further mounting part is engaged with the frame member, and
as seen in the front view of the seat, the weight and the frame member are disposed at positions overlapping with each other in the left-right direction of the seat.

7. The seat device for a vehicle according to claim 6, wherein as seen in the front view of the seat the further mounting part is disposed at a position overlapping with the frame member.

8. The seat device for a vehicle according to claim 2, wherein as seen in a front view of the seat the left and right mounting parts are engaged with the frame so as to cover a front surface of the frame and the further mounting part is engaged with the frame so as to cover a rear surface of the frame.

9. The seat device for a vehicle according to claim 1, wherein the weight is supported in all directions within the damper case via the elastic member.

10. A dynamic damper device, which is configured to be attached to a frame within a cushion member of a seat for a vehicle, the dynamic damper device comprising:
a damper case that is configured to be housed in the cushion member;
a weight housed in the damper case; and
an elastic member which is separate member from the cushion member and disposed in the damper case between a wall of the damper case and the weight.

11. The dynamic damper device according to claim 10, wherein the weight and the elastic member are configured so that the weight and the elastic member are replaceable in the case with another weight and another elastic member.

12. The dynamic damper device according to claim 11, wherein
the case includes two case halves which cover the elastic member from front and rear directions, respectively, and
a plurality of claws which connect mating surfaces of the case halves with each other are disposed on the mating surface of one of the case halves so as to surround the elastic member in a U-shape from three directions.

13. The dynamic damper device according to claim 11, wherein as seen in a front view of the seat, left and right mounting parts which are provided respectively on left and right side surfaces of the case and are configured to be engaged with the frame, and the elastic member is disposed at a position between the left and right mounting parts.

14. The dynamic damper device according to claim 10, wherein
the frame includes main frame members extending in an up-down direction of the seat and upper frame members extending forward from upper ends of the main frame members respectively, and
as seen in a side view of the seat, the elastic member is configured to be disposed at a position overlapping with the upper frame members.

15. The dynamic damper device according to claim 10, wherein
the frame includes main frame members extending in an up-down direction of the seat, upper frame members extending forward from upper ends of the main frame members respectively, and front vertical frame members extending downward from front ends of the upper frame members respectively, and
the elastic member is configured to be disposed at a position overlapping with the front vertical frame members and the weight as seen in a side view of the seat.

16. A headrest device, comprising the dynamic damper device according to claim 10.

17. The dynamic damper device according to claim 10, wherein the weight is supported in all directions within the damper case via the elastic member.

* * * * *